United States Patent
Song et al.

(10) Patent No.: US 11,528,649 B2
(45) Date of Patent: Dec. 13, 2022

(54) TCU SWITCHING METHOD AND APPARATUS, AND MESSAGE SYNCHRONIZATION METHOD AND APPARATUS

(71) Applicant: Huawei Technologies Co., Ltd., Shenzhen (CN)

(72) Inventors: Yonggang Song, Beijing (CN); Hui Li, Shenzhen (CN); Fuxiang Xiong, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 58 days.

(21) Appl. No.: 16/815,949

(22) Filed: Mar. 11, 2020

(65) Prior Publication Data
US 2020/0213921 A1    Jul. 2, 2020

Related U.S. Application Data

(63) Continuation of application No. PCT/CN2018/105081, filed on Sep. 11, 2018.

(30) Foreign Application Priority Data

Sep. 12, 2017   (CN) .......................... 201710818202.0

(51) Int. Cl.
*H04W 36/18*   (2009.01)
*H04W 4/44*    (2018.01)
(Continued)

(52) U.S. Cl.
CPC ............. *H04W 36/18* (2013.01); *H04W 4/44* (2018.02); *H04W 36/12* (2013.01); *H04W 36/32* (2013.01); *H04W 36/38* (2013.01)

(58) Field of Classification Search
None
See application file for complete search history.

(56) References Cited

U.S. PATENT DOCUMENTS

2009/0042572 A1* 2/2009 Craig .................... H04W 36/28
                                                        455/436
2010/0227593 A1* 9/2010 Myr ....................... G08G 1/052
                                                        455/414.1
(Continued)

FOREIGN PATENT DOCUMENTS

CN    102256322 A    11/2011
CN    103441847 A    12/2013
(Continued)

OTHER PUBLICATIONS

ZTE, "Localized Uu based V2X architecture concerning on eMBMS," XP051066627, 3GPP TSG-RAN WG3 #91 R3-160206, St.Julian's, Malta, Feb. 15-19, 2016, 5 pages.
(Continued)

*Primary Examiner* — Jay L Vogel
(74) *Attorney, Agent, or Firm* — Conley Rose, P.C.

(57) ABSTRACT

A transportation control unit (TCU) switching method includes receiving a first device message of a first device, determining a first location of the first device based on the first device message, and when the first location of the first device is in an information exchange area, sending the first device message of the first device to a second TCU, and when the first location of the first device meets a first preset condition, handing over the first device to the second TCU. In the present disclosure, the information exchange area is set, and a device message from an electronic device in the information exchange area is synchronized to a TCU to be obtained after switching from a TCU existing before the switching.

26 Claims, 24 Drawing Sheets

(51) Int. Cl.
*H04W 36/12* (2009.01)
*H04W 36/32* (2009.01)
*H04W 36/38* (2009.01)
*H04W 4/40* (2018.01)
*H04W 36/00* (2009.01)

(56) References Cited

U.S. PATENT DOCUMENTS

| | | | |
|---|---|---|---|
| 2011/0013586 A1* | 1/2011 | Oh | H04W 8/26 370/331 |
| 2014/0031044 A1* | 1/2014 | Mazzarella | H04W 36/245 455/440 |
| 2014/0126410 A1* | 5/2014 | Agarwal | H04W 64/006 370/332 |
| 2015/0078333 A1* | 3/2015 | Byers | H04W 36/32 370/331 |
| 2016/0155327 A1 | 6/2016 | Schlienz et al. | |
| 2016/0219457 A1* | 7/2016 | Nammi | H04B 1/1036 |
| 2017/0219369 A1* | 8/2017 | Lei | G08G 1/096758 |
| 2018/0063261 A1* | 3/2018 | Moghe | G08G 1/123 |
| 2018/0206089 A1* | 7/2018 | Cavalcanti | H04W 48/16 |
| 2018/0262887 A1* | 9/2018 | Futaki | H04W 88/04 |
| 2018/0279183 A1* | 9/2018 | Song | G08G 1/0112 |
| 2018/0332509 A1 | 11/2018 | Feng | |
| 2019/0004179 A1 | 1/2019 | Hwang et al. | |
| 2019/0104450 A1* | 4/2019 | Adachi | H04W 36/0058 |

FOREIGN PATENT DOCUMENTS

| | | |
|---|---|---|
| CN | 105280005 A | 1/2016 |
| CN | 105679061 A | 6/2016 |
| CN | 103442389 B | 8/2016 |
| CN | 106657209 A | 5/2017 |
| CN | 107613527 A | 1/2018 |
| CN | 107613533 A | 1/2018 |
| EP | 2615857 A1 | 7/2013 |
| WO | 2017105052 A1 | 6/2017 |
| WO | 2017133355 A1 | 8/2017 |
| WO | 2017171806 A1 | 10/2017 |

OTHER PUBLICATIONS

KPN et al., "Detection and routing of V2X messages to relevant V2X service providers," XP051130631, SA WG2 Meeting #116-BIS; S2-164684, Aug. 29-Sep. 2, 2016, Sanya, China, 3 pages.

* cited by examiner

TCU SWITCHING METHOD AND APPARATUS, AND MESSAGE SYNCHRONIZATION METHOD AND APPARATUS

CROSS-REFERENCE TO RELATED APPLICATIONS

This application is a continuation application of International Patent Application No. PCT/CN2018/105081, filed on Sep. 11, 2018, which claims priority to Chinese Patent Application No. 201710818202.0, filed on Sep. 12, 2017. The disclosures of the aforementioned applications are hereby incorporated by reference in their entireties.

TECHNICAL FIELD

Embodiments of this application relate to the field of Internet of Vehicles technologies, and in particular, to a transportation control unit (TCU) switching method and apparatus, and a message synchronization method and apparatus.

BACKGROUND

A vehicle-to-everything (V2X) technology is an emerging trend of an Internet of Vehicles. V2X is a general term for vehicle to vehicle (V2V), vehicle to pedestrian (V2P), and vehicle to network (V2N). To ensure safe traveling of vehicles, a vehicle on a road needs to obtain some data. Road and vehicle conditions such as a road congestion condition ahead and a vehicle accident ahead may be learned through the data, even an accident may be predicted in advance, and then an alarm is given to a driver to make the driver change a driving policy.

With development of the V2X technology, a cellular network technology is gradually used, and a TCU may be deployed to exchange a message with a vehicle. The vehicle may forward, to the transportation control unit using a base station, a message indicating a vehicle status. The transportation control unit may also receive a message forwarded by a roadside sensor and the base station, analyze a road condition with reference to the message sent by the roadside sensor, and send data obtained after analysis to the vehicle using a message.

However, because a TCU is deployed along a roadside, and each TCU covers only a local area of a road, there is certainly a TCU switching problem in a traveling process of a vehicle. In a TCU switching process, transmission of some messages may be interrupted, and consequently, a service is not continuous.

SUMMARY

Embodiments of the present disclosure provide a TCU switching method and apparatus, and a message synchronization method and apparatus in order to resolve a service discontinuity problem in a TCU switching process.

According to a first aspect, a TCU switching method is provided, and applied to a first TCU, where the first TCU is connected to a base station, a management and control area of the first TCU includes a first sub-area in an information exchange area, a management and control area of a second TCU includes a second sub-area in the information exchange area, the second TCU is a neighboring TCU of the first TCU in a traveling direction of a vehicle in which a first device is located, and the method includes receiving a first device message of the first device, determining a first location of the first device based on the first device message, and when the first location of the first device is in the information exchange area, sending the first device message of the first device to the second TCU, and when the first location of the first device meets a first preset condition, handing over the first device to the second TCU.

The first device is a terminal device that supports V2X, for example, an on-board unit (OBU), a smartphone, an on-board control unit (T-Box), or an event data recorder. The first device may be on board, or may be in a form in which a T-Box is combined with a smartphone.

The first device message includes a location, a speed, an acceleration, a steering angle, an angular velocity, an angular acceleration, a vehicle size, weight data, and the like of the vehicle. The first device message may be further a transaction message such as emergent and important information, for example, about emergency braking.

The first TCU and the second TCU may analyze a risk during traveling of the vehicle with reference to the first device message sent by the first device and a road condition collected by a roadside device, and send risk data obtained after analysis to the first device using a message.

The information exchange area may be set such that both the first TCU and the second TCU can receive the first device message sent when the first device is in the information exchange area.

In this embodiment of the present disclosure, the information exchange area is set, and a device message sent by an electronic device in the information exchange area is synchronized to a TCU to be obtained after switching from a TCU existing before the switching. This ensures completeness of a message used when a TCU performs risk analysis on an electronic device in a management and control area of the TCU.

In a possible design, the first preset condition is that the first location is in the second sub-area.

In a possible design, when a message type of the first device message is a transaction message, the first preset condition is that the first location is in the first sub-area, and a distance between the first location and a boundary line between the first sub-area and the second sub-area is less than a preset distance.

In a possible design, the first preset condition is that the first location is in the first sub-area, and a distance between the first location and a boundary line between the first sub-area and the second sub-area is less than a preset distance, and the first TCU has a transaction message to be sent to the first device.

In a possible design, the method further includes delaying handover when the first location of the first device meets the first preset condition, but a message sending and receiving status of the first TCU meets a third preset condition.

In a possible design, the third preset condition is that the first TCU has not responded to a transaction message reported by the first device in the first sub-area.

In a possible design, the third preset condition is that the first TCU has a transaction message to be sent to the first device.

In a possible design, the information exchange area is determined based on a risk analysis requirement.

In a possible design, the information exchange area includes a part of an area, in a coverage area of the base station, that does not overlap a coverage area of another base station, or the information exchange area includes at least an overlapping area between a coverage area of an edge base station of the first TCU and a coverage area of an edge base station of the second TCU.

According to a second aspect, a message synchronization method is provided, where the method is applied to a first TCU, and includes receiving a first device message of a first device, determining a location of the first device based on the first device message, and when the location of the first device is in an information exchange area, sending the first device message of the first device to a second TCU, where the second TCU is a neighboring TCU of the first TCU in a traveling direction of a vehicle in which the first device is located.

In a possible design, the method further includes, when the first device is handed over to the second TCU, receiving a second device message of the first device that is sent by the second TCU, where the second device message of the first device is sent by the first device in the information exchange area.

In a possible design, the information exchange area is determined based on a risk analysis requirement.

In a possible design, the information exchange area includes at least an overlapping area between a coverage area of an edge base station of the first TCU and a coverage area of an edge base station of the second TCU.

According to a third aspect, a message synchronization method is provided, where the method is applied to a second TCU, and includes receiving a first device message of a first device that is sent by a first TCU, receiving a second device message of the first device when the first device is handed over to the second TCU, determining a location of the first device based on the second device message, and when the location of the first device is in an information exchange area, sending the second device message of the first device to the first TCU, where the first TCU is a TCU connected to the first device before TCU switching is performed.

In a possible design, the information exchange area is determined based on a risk analysis requirement.

In a possible design, the information exchange area includes at least an overlapping area between a coverage area of an edge base station of the first TCU and a coverage area of an edge base station of the second TCU.

According to a fourth aspect, a message synchronization method is provided, where the method is applied to a first TCU, and includes sending a driver assistant message to a second device in an information exchange area, where the driver assistant message includes an environment status message and a transaction message, and sending the driver assistant message to a second TCU, where the second TCU is a neighboring TCU of the first TCU in a traveling direction of a vehicle in which the second device is located, and the second TCU sends the driver assistant message to the second device when the second device is handed over to the second TCU.

In a possible design, the driver assistant message is sent in a unicast manner or a broadcast manner.

In a possible design, the information exchange area is determined based on a risk analysis requirement.

In a possible design, the information exchange area includes at least an overlapping area between a coverage area of an edge base station of the first TCU and a coverage area of an edge base station of the second TCU.

According to a fifth aspect, a message synchronization method is provided, where the method is applied to a second TCU, and includes receiving a driver assistant message sent by a first TCU, where a target device of the driver assistant message is a second device in an information exchange area, and the driver assistant message includes an environment status message and a transaction message, receiving a device message of the second device when the second device is handed over to the second TCU, determining a location of the first device based on the device message, and when the location of the second device is in the information exchange area, sending the driver assistant message to the second device.

In a possible design, the driver assistant message is sent in a unicast manner or a broadcast manner.

In a possible design, the information exchange area is determined based on a risk analysis requirement.

In a possible design, the information exchange area includes at least an overlapping area between a coverage area of an edge base station of the first TCU and a coverage area of an edge base station of the second TCU.

According to a sixth aspect, a TCU switching method is provided, and applied to a base station, where a first TCU and a second TCU share the base station, and the method includes receiving a first device message of a first device, determining a first location of the first device based on the first device message, when the first location of the first device is in a first sub-area in an information exchange area, sending the first device message of the first device to the first TCU and the second TCU, where the first sub-area is a management and control area of the first TCU, and the second TCU is a neighboring TCU of the first TCU in a traveling direction of a vehicle in which the first device is located, and when the first location of the first device meets a first preset condition, handing over the first device to the second TCU.

In a possible design, the first preset condition is that the first location is in a second sub-area in the information exchange area, and the second sub-area is a management and control area of the second TCU.

In a possible design, when a message type of the first device message is a transaction message, the first preset condition is that the first location is in the first sub-area, and a distance between the first location and a boundary line between the first sub-area and a second sub-area is less than a preset distance.

In a possible design, the method further includes delaying handover when the first location of the first device meets the first preset condition, but a message sending and receiving status of the base station meets a second preset condition.

In a possible design, the second preset condition is that the base station has not received a response message of a transaction message reported by the first device in the first sub-area.

In a possible design, the second preset condition is that the base station has not sent, to the first device, a received transaction message sent by the first TCU.

After the handing over the first device to the second TCU, the method further includes receiving a transaction message sent by the first TCU, and modifying a message source of the transaction message to the second TCU, and sending the modified transaction message to the first device.

In a possible design, the sending the first device message of the first device to the first TCU and the second TCU includes sending the first device message of the first device to the first TCU, and instructing the first TCU to send the first device message to the second TCU, or separately sending the first device message of the first device to the first TCU and the second TCU, or sending the first device message of the first device to the first TCU, and when the first TCU determines, based on the first device message, that the first device is in the information exchange area, sending the first device message to the second TCU.

In a possible design, after the handing over the first device to the second TCU, the method further includes receiving a second device message of the first device, determining a second location of the first device based on the second device message, and when the second location of the first device is in the second sub-area, sending the second device message of the first device to the second TCU and the first TCU.

In a possible design, the sending the second device message of the first device to the second TCU and the first TCU includes sending the second device message of the first device to the second TCU, and instructing the second TCU to send the second device message to the first TCU, or separately sending the first device message of the first device to the first TCU and the second TCU, or sending the second device message of the first device to the second TCU, and when the second TCU determines, based on the second device message, that the first device is in the information exchange area, sending the second device message to the first TCU.

In a possible design, the information exchange area is determined based on a risk analysis requirement.

In a possible design, the information exchange area includes a part of an area, in a coverage area of the base station, that does not overlap a coverage area of another base station.

According to a seventh aspect, a TCU switching apparatus is provided, and applied to a first TCU and a base station, where the apparatus includes a plurality of function modules in order to implement any one of the first aspect or the possible designs of the first aspect, or the TCU switching method according to any one of the sixth aspect or the possible designs of the sixth aspect.

According to an eighth aspect, a message synchronization apparatus is provided, and applied to a first TCU and a second TCU, where the apparatus includes a plurality of function modules in order to implement the message synchronization method according to any one of the second aspect to the fifth aspect and the message synchronization method according to any one of the possible designs of the second aspect to the fifth aspect.

According to a ninth aspect, a TCU is provided, where the TCU stores a plurality of instructions, and the instructions are suitable for a processor to load and perform the TCU switching method or the message synchronization method according to any one of the first aspect to the fifth aspect and the TCU switching method or the message synchronization method according to any one of the possible designs of the first aspect to the fifth aspect.

According to a tenth aspect, a base station is provided, where the base station stores a plurality of instructions, and the instructions are suitable for a processor to load and perform the TCU switching method according to any one of the sixth aspect or the possible designs of the sixth aspect.

According to an eleventh aspect, a computer-readable storage medium is provided, where an instruction is stored on the computer-readable storage medium, and the instruction is executed by a processor to complete the TCU switching method or the message synchronization method according to any one of the first aspect to the sixth aspect and the TCU switching method or the message synchronization method according to any one of the possible designs of the first aspect to the sixth aspect.

DESCRIPTION OF EMBODIMENTS

Figure 1A:
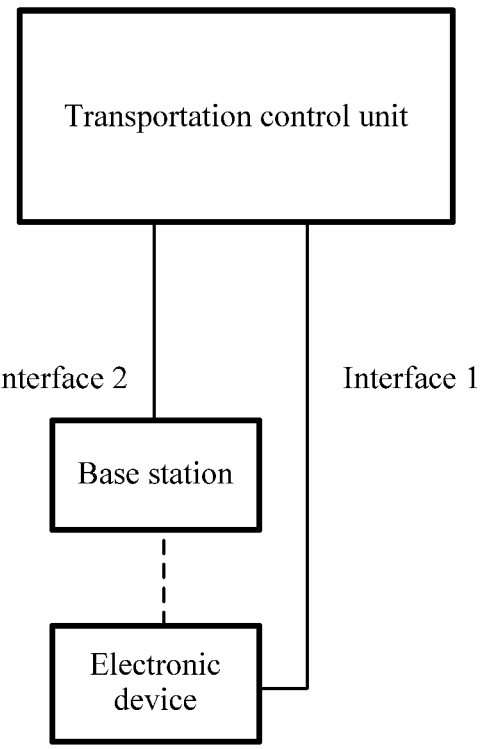
FIG. 1A is a schematic diagram of an implementation environment according to an embodiment of the present disclosure.

For ease of understanding the present disclosure, an implementation environment of a TCU switching method and a message synchronization method is described herein. Referring to FIG. 1A, the implementation scenario includes an electronic device, a base station, and a TCU.

The electronic device is a terminal device that supports V2X, for example, an OBU, a smartphone, a T-Box, or an event data recorder. The OBU is used as an example. The OBU may be on board, or may be in a form in which a T-Box is combined with a smartphone. The OBU can obtain status data such as lane-level location data and a vehicle speed, periodically send the data to the TCU using a cellular network, and the OBU can receive risk data such as an alarm, an event, a traffic signal light, and a traffic sign. Based on the risk data, the OBU prompts a driver using a voice, a video, or the like. The electronic device in another possible implementation form may also have a similar function, or different function designs are used based on different design requirements of a designer in order to implement some or richer functions. Details are not described herein. In the embodiment of the present disclosure, both a first device and a second device may be the electronic device.

The base station is configured to provide wireless communication between the electronic device and the TCU, and may be a base station in a second generation (2G), third generation (3G), fourth generation (4G), or fifth generation (5G) network.

The TCU may be a server deployed on a network side. The TCU cooperates with a communications network, receives status data, and the like from the first device using a local break out (LBO) capability or a mobile edge computing (MEC) capability of the network, and applies for a network resource based on a requirement using a risk reflected by the data, to send data of different sending policies to an electronic device. The sending policy may be set in consideration of a requirement on an emergency degree, a delay, reliability, and the like. During data exchange between the TCU and the electronic device, a communication delay may be reduced using the LBO capability or the MEC capability of the network.

Certainly, in the implementation environment, there may be a roadside device, a roadside sensor, and a central service unit (CSU) that are used to indicate a road condition or indicate a road condition change, such as a traffic signal light/a traffic sign. The roadside device may provide data such as traffic signal light data and traffic sign data for the TCU, and the TCU forwards the data to an electronic device in a management and control area of the roadside device. The roadside sensor may be a sensor device such as a camera, a laser radar, or a millimeter-wave radar. Perception data generated by the roadside sensor may be originally collected video streams and point cloud data of a radar. The roadside sensor may be disposed on a roadside based on a requirement, to obtain perception data in the management and control area of the roadside sensor, where the perception data is actually status data of a vehicle, a person, or an object, and such status data is sent to the TCU. The TCU may analyze a risk during vehicle traveling with reference to such status data. The CSU may send risk data such as alarm data and traffic environment data to the TCU, and the TCU forwards the risk data to the electronic device.

Communication between the electronic devices, between the electronic device and the roadside sensor, between the electronic device and the roadside device (a traffic signal light and a traffic sign), between the electronic device and the CSU, and between the electronic device and the network all need to be performed using the TCU. A procedure of notifying vehicle status data between a vehicle and a vehicle, a procedure of sending alarm data between a vehicle and a vehicle, a procedure of sharing perception between a road and a vehicle and between a vehicle and a vehicle, a procedure of sending traffic environment data to the electronic device by the roadside device or the CSU, and the like may be implemented based on this communication manner.

In addition, in the foregoing implementation environment, long term evolution-Uu (LTE-Uu) means an interface between the base station and the electronic device, and is also a physical access layer interface for communication between the electronic device and the TCU. For example, in a 4G Long Term Evolution (LTE) network, LTE-Uu may be an interface between a terminal and a 2G, 3G, 4G, or 5G cellular network. An interface 1 is an application layer interface for communication between the electronic device and the TCU. The electronic device sends vehicle status data to the TCU using the interface 1. The TCU sends risk data to the electronic device using the interface 1. An interface 2 is an interface for communication between the TCU and a communications network. The TCU needs to reduce a communication delay using an LBO capability and a MEC capability of the network in order to implement an anti-collision driver assistant application with high real-time performance. The TCU may be connected to different network element devices of a cellular network based on a deployment requirement. Different network element devices provide different interfaces. The TCU needs to adapt to these interfaces in order to ensure a communication delay, reliability, and bandwidth between the electronic device and the TCU.

In the foregoing content, functions of the devices in the implementation environment are separately described. However, when a TCU is actually deployed, there may be different networking manners between the TCU and base station.

Figure 1B:
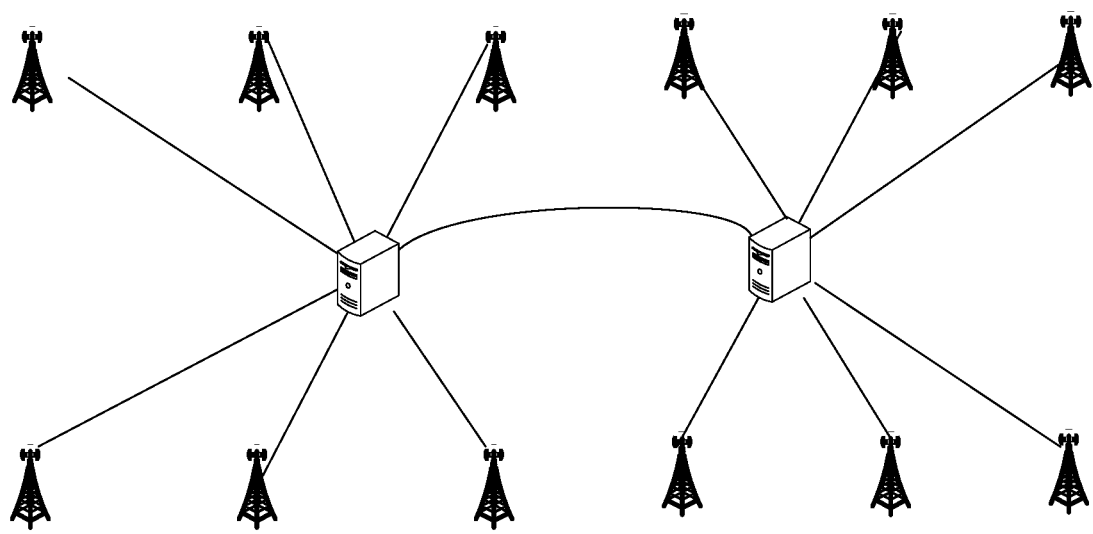
FIG. 1B is a schematic diagram of star networking according to an embodiment of the present disclosure.

FIG. 1B is a schematic diagram of star networking according to an embodiment of the present disclosure. Referring to FIG. 1B, a connection manner between a TCU and a base station is a point-to-multipoint connection, and therefore the networking may be referred to as star networking. In the star networking, one TCU may be connected to a plurality of base stations, each base station belongs to only one TCU, and a base station managed by one TCU is not connected to another TCU.

Figure 1C:
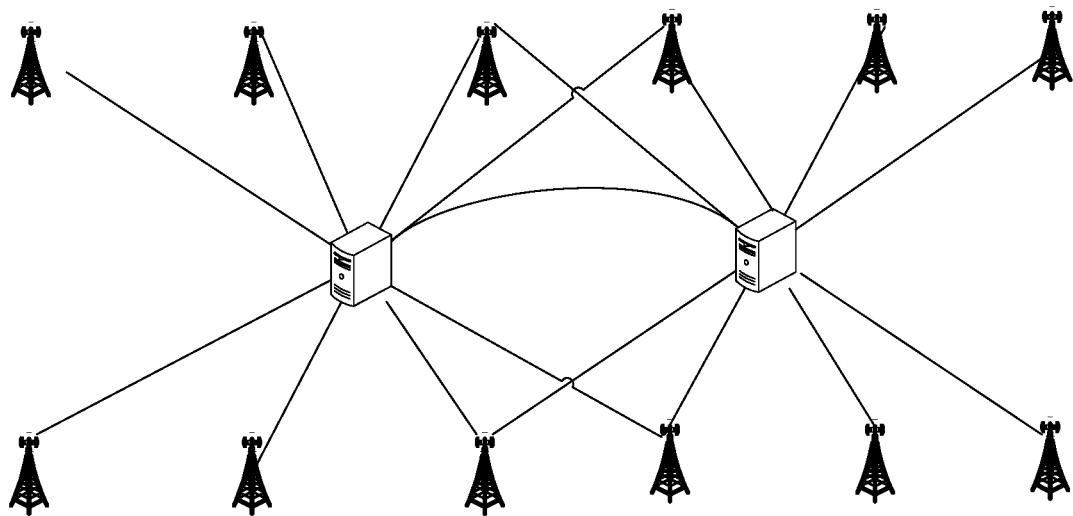
FIG. 1C is a schematic diagram of M-shaped networking according to an embodiment of the present disclosure.

FIG. 1C is a schematic diagram of M-shaped networking according to an embodiment of the present disclosure. Referring to FIG. 1C, a connection manner between a TCU and a base station is a multipoint-to-multipoint connection, and therefore the networking may be referred to as M-shaped networking. In the M-shaped networking, one TCU may be connected to a plurality of base stations, and each base station may be connected to a plurality of TCUs. Therefore, a coverage area of the base station may be divided into a plurality of parts such that a TCU to which an electronic device belongs is determined based on a location of the electronic device in the coverage area of the base station, and processing processes for an uplink message and a downlink message of the electronic device are determined.

Figure 2:
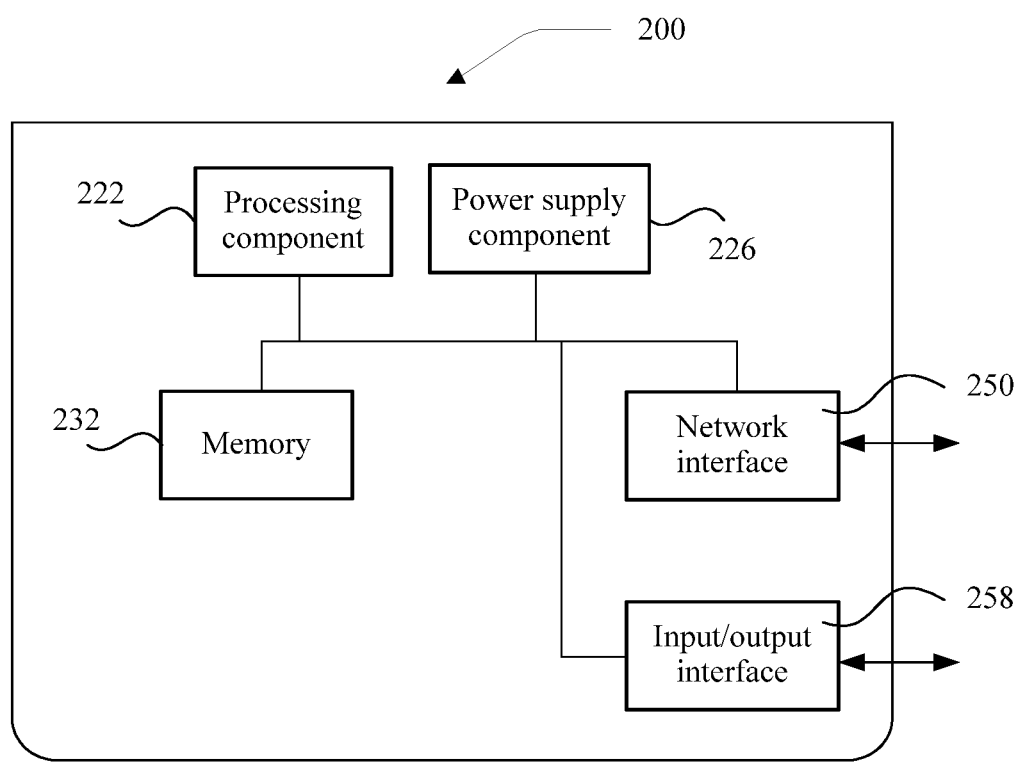
FIG. 2 is a structural block diagram of a TCU 200 according to an embodiment of the present disclosure.

FIG. 2 is a structural block diagram of a TCU 200 according to an embodiment of the present disclosure. For example, the TCU 200 may be provided as a server. Referring to FIG. 2, the TCU 200 includes a processing component 222 that further includes one or more processors, and a memory resource represented by a memory 232 configured to store an instruction, for example, an application program, that can be executed by the processing component 222. The application program stored in the memory 232 may include one or more modules that each correspond to a set of instructions. In addition, the processing component 222 is configured to execute the instructions, to perform a message synchronization method or a TCU switching method provided in the following method embodiments.

The TCU 200 may further include a power supply component 222 configured to perform power management of the TCU 200, a wired or wireless network interface 250 configured to connect the TCU 200 to a network, and an input/output (I/O) interface 258. The TCU 200 may operate an operating system stored in the memory 232, such as WINDOWS SERVER, MAC OS, UNIX, LINUX, or FREE-BSD.

In an example embodiment, a computer-readable storage medium is further provided, such as a memory including an instruction. The instruction can be executed by a processor in a TCU to complete a TCU switching method or a message synchronization method in the following embodiments. For example, the computer-readable storage medium may be a read only memory (ROM), a random access memory (RAM), a compact disc ROM (CD-ROM), a magnetic tape, a floppy disk, or an optical data storage device.

Figure 3:
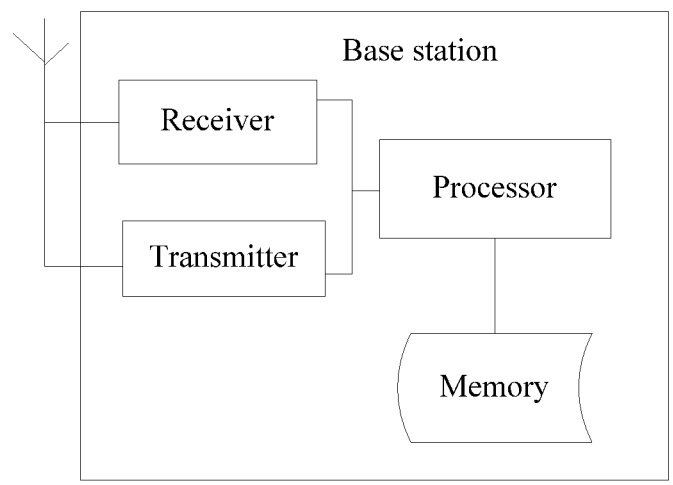
FIG. 3 is a structural block diagram of a base station according to an embodiment of the present disclosure.

FIG. 3 is a structural block diagram of a base station according to an embodiment of the present disclosure. For example, the base station includes a transmitter, a receiver, a memory, and a processor that is separately connected to the transmitter, the receiver, and the memory. Certainly, the base station may further include a universal component such as an antenna, a baseband processing component, an intermediate radio frequency processing component, or an I/O apparatus. This is not limited in this embodiment of the present disclosure. The base station is configured to perform a TCU switching method on a base station side provided in any one of the following embodiments.

Figure 4A:
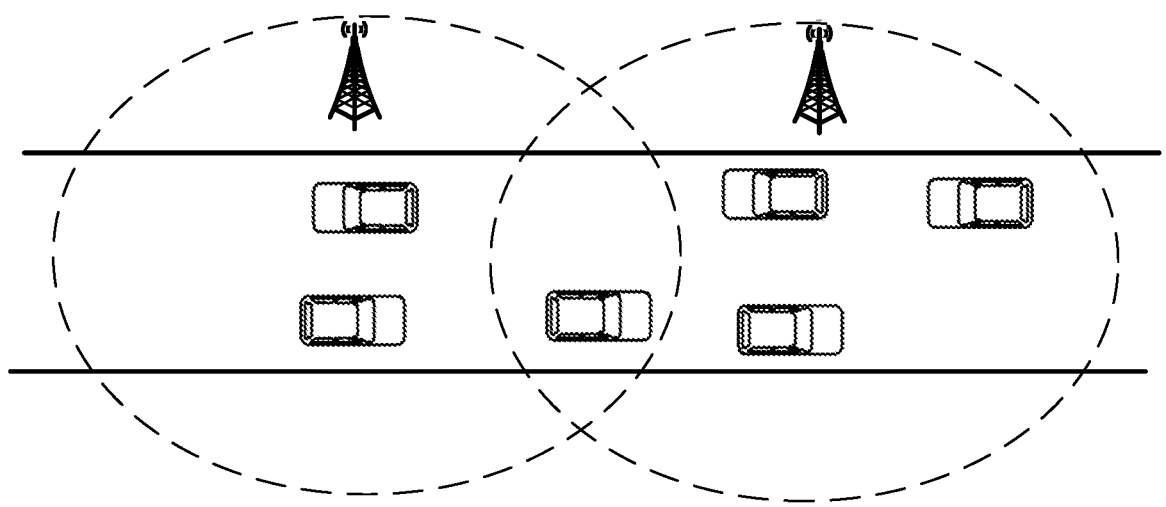
FIG. 4A is a schematic diagram of a vertical coverage manner of a base station according to an embodiment of the present disclosure.
Figure 4B:
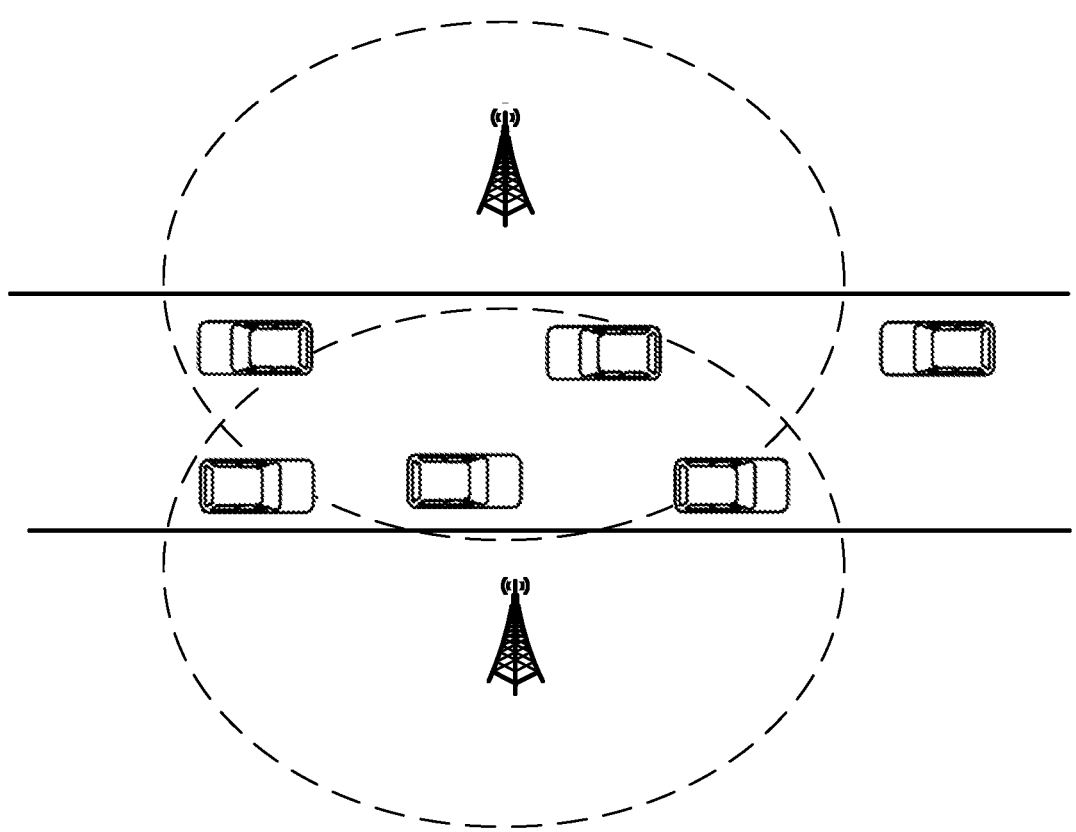
FIG. 4B is a schematic diagram of a horizontal coverage manner of a base station according to an embodiment of the present disclosure.

FIG. 4A is a schematic diagram of a vertical coverage manner of a base station according to an embodiment of the present disclosure. FIG. 4B is a schematic diagram of a horizontal coverage manner of a base station according to an embodiment of the present disclosure. In consideration of a feature that a road is narrow and long, a message synchronization method and a TCU switching method provided in the present disclosure are technical solutions based on the vertical coverage manner of the base station. When the base station is in the horizontal coverage manner, optimization may be performed through network planning and network optimization.

Both the message synchronization method and the TCU switching method provided in the present disclosure relate to manners of processing an uplink message and a downlink message. The uplink message includes a vehicle status message and a transaction message. The vehicle status message is a message that is periodically sent by an electronic device to a TCU and that is used to indicate a traveling status of a vehicle in which the electronic device is located, and the transaction message is an emergent and important message, for example, about emergency braking. The downlink message includes an environment status message and a transaction message. The environment status message is periodically sent by the TCU to an electronic device in a management and control area of the TCU, and is used to indicate a current road condition of the management and control area, for example, a traffic signal condition and a road congestion condition, and the transaction message includes alarm information and information about a risk object.

In the message synchronization method and the TCU switching method provided in the present disclosure, a processing process for an uplink message includes the following. When an electronic device enters an information exchange area, all uplink messages sent by the electronic device are sent to a TCU to which the electronic device belongs, the electronic device may synchronize the uplink messages to a neighboring TCU, and the neighboring TCU is determined based on a traveling direction of a vehicle in which the electronic device is located. When the TCU of the electronic device is switched, an uplink message that needs to be sent by the electronic device is sent to a TCU obtained after the switching, and the TCU obtained after the switching synchronizes the uplink message to the TCU existing before the switching. When the vehicle in which the electronic device is located travels out of the information exchange area, the TCU obtained after the switching no longer sends, to the TCU existing before the switching, an uplink message sent by the electronic device. When the electronic device is in the information exchange area, both the TCU existing before the switching and the TCU obtained after the switching may use the received uplink message as a message basis when performing risk analysis on the electronic device in management and control areas of the TCUs.

In the message synchronization method and the TCU switching method provided in the present disclosure, a processing process for a downlink message includes the following. When an electronic device is in an information exchange area, a TCU to which the electronic device belongs sends a downlink message to the electronic device. When the TCU to which the electronic device belongs is switched, a TCU obtained after the switching sends the downlink message to the electronic device.

The present disclosure describes specific a processing procedure for an uplink message and a processing procedure for a downlink message below in each of different networking manners.

Figure 5A:
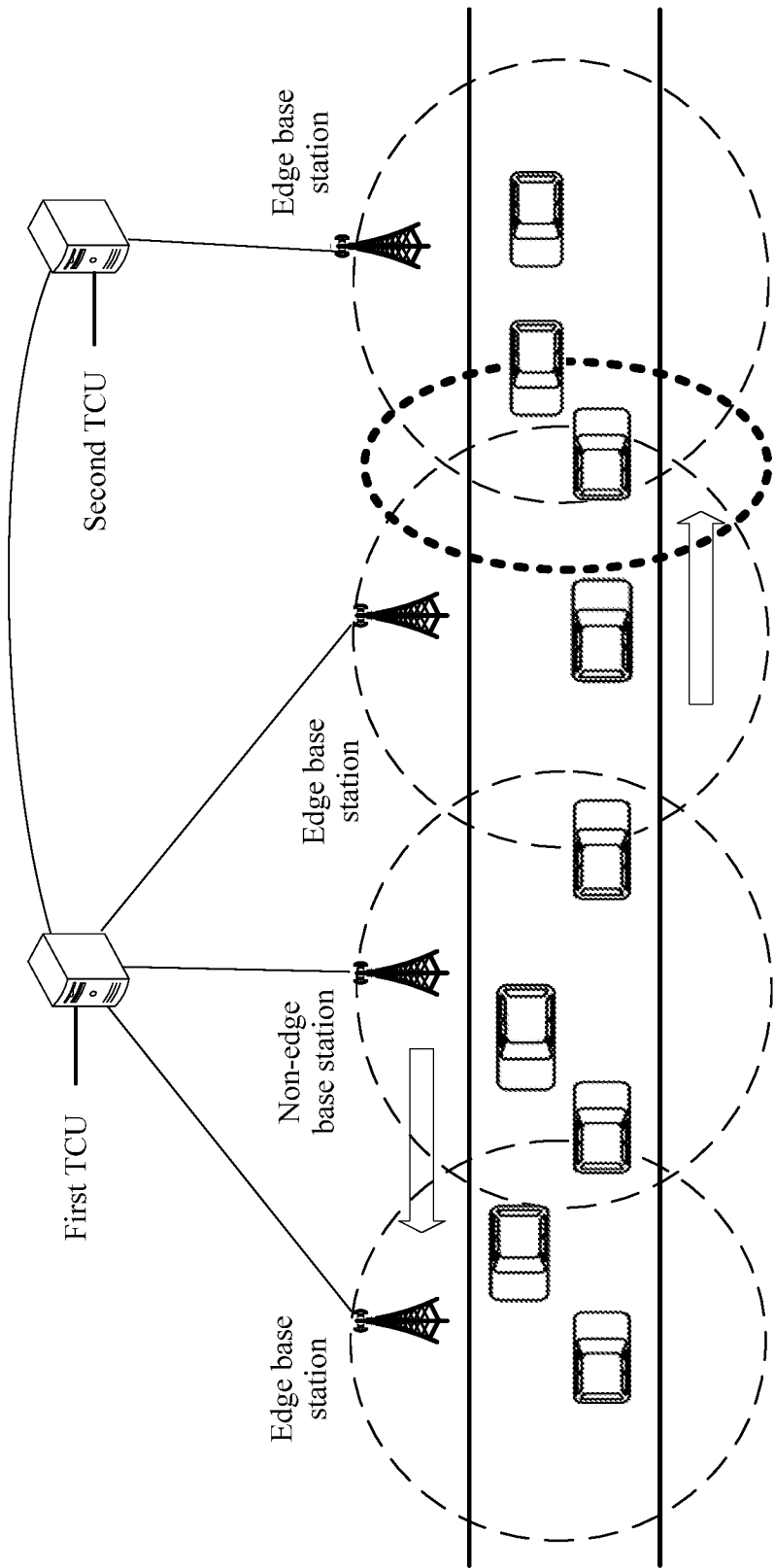
FIG. 5A is a schematic diagram of TCU deployment in star networking according to an embodiment of the present disclosure.

FIG. 5A is a schematic diagram of TCU deployment in star networking according to an embodiment of the present disclosure. In this embodiment of the present disclosure, referring to FIG. 5A, in the star networking, each TCU may be connected to a plurality of base stations, the plurality of base stations are classified into a non-edge base station and an edge base station, the non-edge base station is a base station that has no area overlapping a coverage area of a base station connected to another TCU, and the edge base station is a base station that has an area overlapping a coverage area of a base station connected to another TCU. An edge base station of a first TCU is not connected to a second TCU, and an edge base station of the second TCU is not connected to the first TCU.

It is assumed that a vehicle is traveling on a current road, and an electronic device configured on the vehicle is referred to as a first device. A traveling direction of the vehicle in which the first device is located may be from a management and control area of the first TCU to a management and control area of the second TCU, and the second TCU is a neighboring TCU of the first TCU in the traveling direction of the vehicle in which the first device is located. The management and control area of the first TCU is a coverage area of a base station connected to the first TCU, and the management and control area of the second TCU is a coverage area of a base station connected to the second TCU.

In an overlapping area between a coverage area of the edge base station of the first TCU and a coverage area of the edge base station of the second TCU, a base station connected to the first device is determined by signal strength of the edge base station of the first TCU and signal strength of the edge base station of the second TCU. Because the vehicle has features of a high speed, no reciprocating motion, and no lateral motion, a case in which repeated switching occurs due to changes in the signal strength of the two base stations may be excluded in this embodiment of the present disclosure. For example, a base station that is initially connected to the first device is the edge base station of the first TCU. When the first device is in the overlapping area between the coverage area of the edge base station of the first TCU and the coverage area of the edge base station of the second TCU, and the first device detects that the signal strength of the edge base station of the second TCU is greater than the signal strength of the edge base station of the first TCU, the first device is disconnected from the edge base station of the first TCU, and establishes a connection to the edge base station of the second TCU such that a process of switching from the first TCU to the second TCU may be implemented.

Therefore, an information exchange area may be set, and a message synchronization method is used such that both the first TCU and the second TCU can receive a device message sent when the first device is in the information exchange area. The information exchange area includes at least the overlapping area between the coverage area of the edge base station of the first TCU and the coverage area of the edge base station of the second TCU such that the base station connected to the first device is switched from the edge base station of the first TCU to the edge base station of the second TCU. Therefore, when the first device is handed over from management and control of the first TCU to management and control of the second TCU, completeness of a message used when the second TCU performs risk analysis on the first device can be ensured.

Also, only an area in a vertical direction of a road is considered for determining the information exchange area, and an intersection road edge is used as a horizontal edge of the information exchange area. A size of the information exchange area in the vertical direction of the road may be determined based on a risk analysis requirement, that is, based on the overlapping area between the coverage area of the edge base station of the first TCU and the coverage area of the edge base station of the second TCU, a safety reaction time, and a road upper limit speed. For example, if the safety reaction time is 3 seconds, and the road upper limit speed is 120 kilometers/hour, the size of the information exchange area in the vertical direction of the road may be obtained by increasing, in the vertical direction of the road based on the overlapping area, 100 meters, that is, a distance traveled within 3 seconds by the vehicle in which the first device is located. In an embodiment, the information exchange area may be further determined based on another factor. This is not limited in the present disclosure.

Optionally, considering that a change in radio signal strength of a base station is related to weather, a quantity of electronic devices in a coverage area of the base station, and a location of the electronic device, there is a fluctuation in an actual coverage area of the base station. Therefore, for completeness of a message, the information exchange area may be set to a size greater than the distance increased in the vertical direction of the road and traveled within the safety reaction time by the vehicle in which the first device is located. A specific setting may be implemented with reference to a related engineering specification. This is not limited in the present disclosure.

Figure 6:
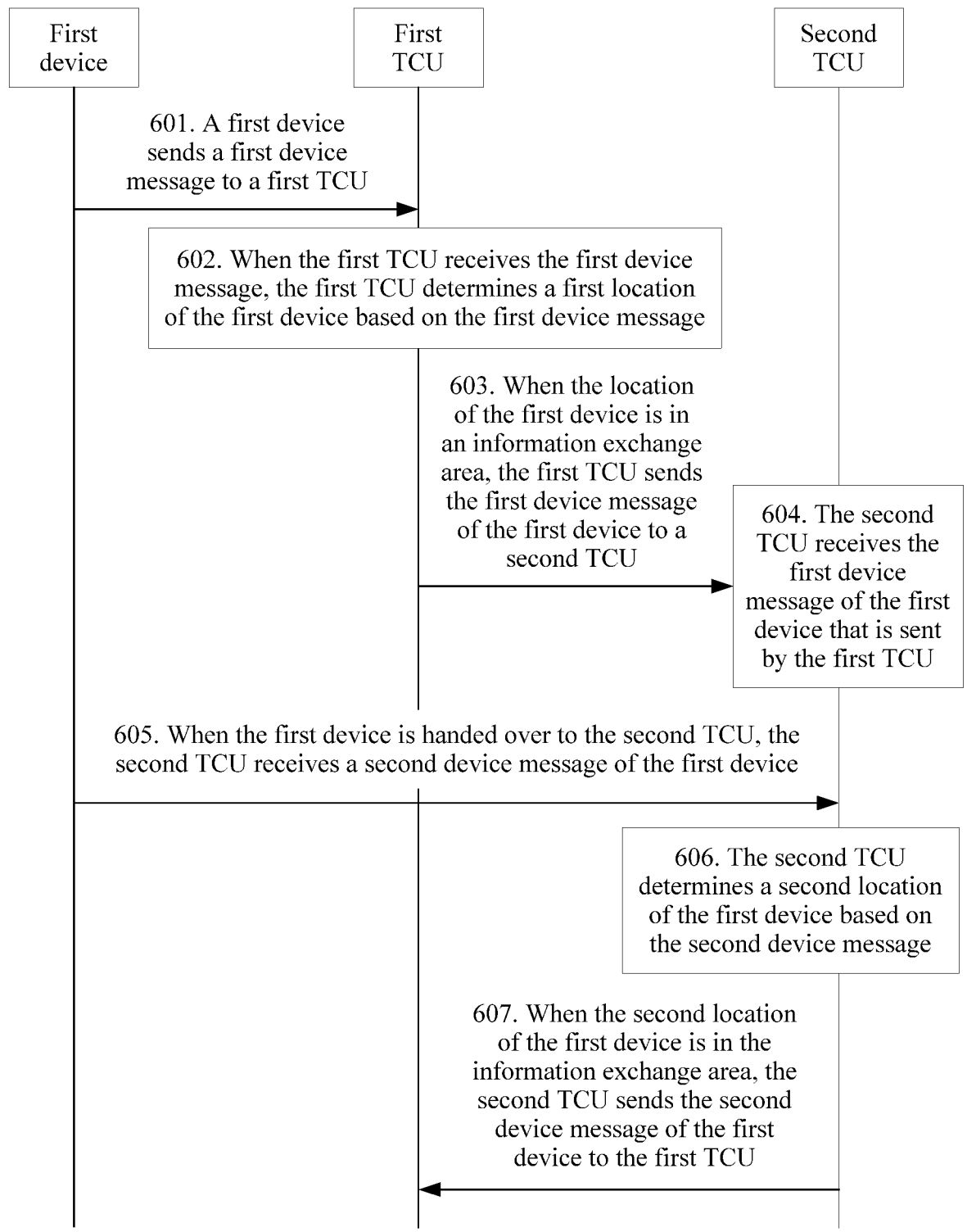
FIG. 6 is a flowchart of a message synchronization method according to an embodiment of the present disclosure.
Figure 7:
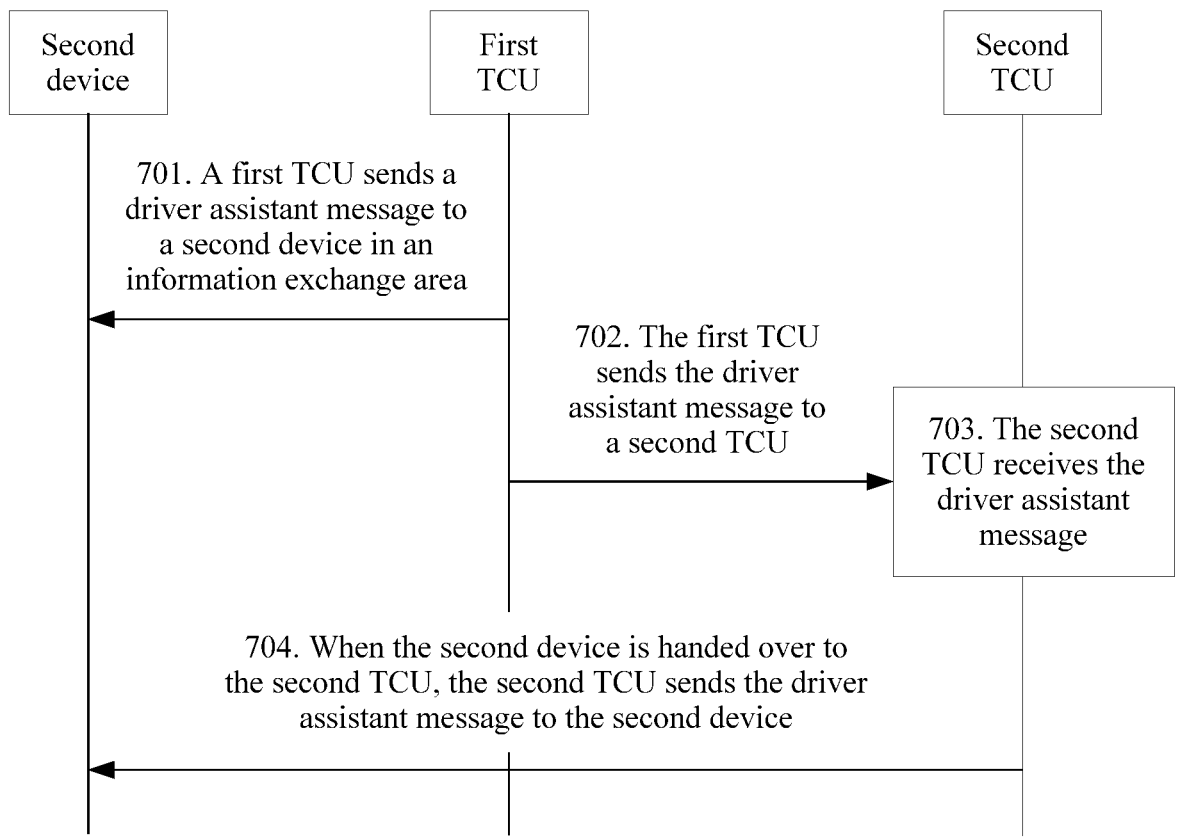
FIG. 7 is a flowchart of a message synchronization method according to an embodiment of the present disclosure.

The following separately describes, using embodiments shown in FIG. 6 and FIG. 7, the uplink message synchronization method and the downlink message synchronization method in the star networking in the embodiment shown in FIG. 5A.

Figure 5B:
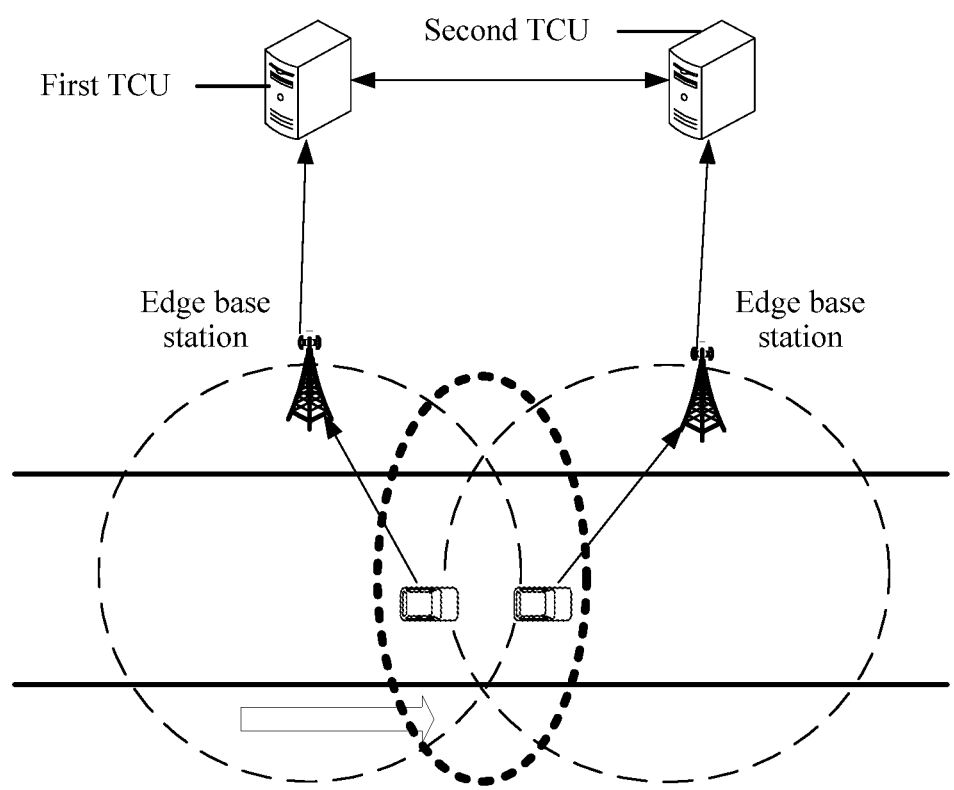
FIG. 5B is a schematic diagram of an uplink message processing process in star networking according to an embodiment of the present disclosure.

FIG. 6 is a flowchart of a message synchronization method according to an embodiment of the present disclosure. The message synchronization method is a message synchronization method for an uplink message in star networking. FIG. 5B is a schematic diagram of an uplink message processing process in star networking according to an embodiment of the present disclosure. Referring to FIG. 5B and FIG. 6, the message synchronization method includes the following steps.

601. A first device sends a first device message to a first TCU.

For the first device, the first device may periodically (for example, at an interval of 10 hertz) send the first device message to the TCU in order to notify the TCU of a traveling status of a vehicle in which the first device is located. The first device message includes a location, a speed, an acceleration, a steering angle, an angular velocity, an angular acceleration, a vehicle size, weight data, and the like of the vehicle. The first device message may be further a transaction message such as emergent and important information, for example, about emergency braking. The first device sends the first device message to the first TCU using a base station of the first TCU.

602. When the first TCU receives the first device message, the first TCU determines a first location of the first device based on the first device message.

When receiving the first device message sent by the first device, the first TCU may perform risk analysis on the first device based on the first device message such that the first device may obtain, from the first TCU, a risk condition near a traveling position of the vehicle in which the first device is located. Certainly, the first TCU may further provide, for the first device, an environment status message near the traveling position of the vehicle in which the first device is located. In addition, when receiving the first device message, the first TCU stores the first device message such that the first TCU uses the first device message as a message basis when subsequently performing risk analysis on the first device and another electronic device near the first device.

The first TCU needs to determine the first location of the first device when receiving the first device message in order to perform the foregoing process of performing risk analysis and providing a message service based on the first location of the first device. In addition, the first TCU may also determine, based on the first location of the first device, whether the first device is in an information exchange area in order to determine whether the first TCU needs to synchronously send the first device message of the first device to a second TCU.

Because the first device message sent by the first device includes the first location of the first device, after receiving the first device message, the first TCU may determine the first location of the first device in a manner of extracting the location from the first device message.

603. When the location of the first device is in an information exchange area, the first TCU sends the first device message of the first device to a second TCU.

When the location of the first device is in the information exchange area, the first TCU may send the first device message of the first device to the second TCU through a network connection such that the second TCU may obtain the first device message of the first device before a TCU of the first device is switched to the second TCU in order to ensure completeness of a message of the first device received by the second TCU.

604. The second TCU receives the first device message of the first device that is sent by the first TCU.

After receiving the first device message of the first device, the second TCU may also use the first device message of the first device as basis data for risk analysis when performing risk analysis on an electronic device in a management and control area of the second TCU.

When the second TCU performs risk analysis on an electronic device in the management and control area of the second TCU, another electronic device in a specific range around the electronic device may be considered, and it is determined, based on a device message of the other electronic device, that is, based on information such as a location, a speed, an acceleration, a heading direction, and a steering angle of the other electronic device, whether the other electronic device causes a safety risk to traveling of a vehicle in which the electronic device is located. It should be noted that the other electronic device may be an electronic device in the management and control area of the second TCU, or may be an electronic device that does not belong to the management and control area of the second TCU but is in the information exchange area. When the electronic device is near the information exchange area, when performing risk analysis on the electronic device, the second TCU may consider another electronic device that is in the information exchange area and that is relatively close to the electronic device. A process in which the first TCU performs risk analysis on an electronic device in a management and control area of the first TCU is similar to that in step 604.

605. When the first device is handed over to the second TCU, the second TCU receives a second device message of the first device.

When the first device establishes a connection to an edge base station of the second TCU because signal strength of the edge base station of the second TCU is greater than signal strength of an edge base station of the first TCU, the first device is handed over to the second TCU.

The first device sends a deregistration message to the first TCU, and simultaneously sends a registration message to the second TCU, the first TCU receives the deregistration message and responds to the deregistration message, and removes the first device from management and control device information of the first TCU, the second TCU receives the registration message of the first device, and responds to the registration message, and when the first device is successfully registered, the TCU to which the first device belongs is switched from the first TCU to the second TCU.

When the first device is handed over to the second TCU, the second device message of the first device is sent to the second TCU using the edge base station of the second TCU, and the second TCU receives the second device message such that the second device message may be processed.

606. The second TCU determines a second location of the first device based on the second device message.

Similar to step 602, the second device message also includes the second location of the first device. Therefore, after receiving the second device message, the second TCU may determine the second location of the first device in a manner of extracting the location from the second device message.

607. When the second location of the first device is in the information exchange area, the second TCU sends the second device message of the first device to the first TCU.

Similar to step 603, when the second location of the first device is in the information exchange area, the second TCU sends the second device message of the first device to the first TCU such that both the first TCU and the second TCU can receive all device messages of the first device in the information exchange area, and message completeness is implemented.

Similar to step 604, when receiving the second device message, the first TCU may also use the second device message as basis data for performing risk analysis on an electronic device in the management and control area of the first TCU. A process in which the first TCU performs risk analysis on an electronic device in the management and control area of the first TCU is similar to that in step 604.

When the vehicle in which the first device is located travels out of the information exchange area, if receiving a third device message of the first device, the second TCU no longer sends the third device message to the first TCU.

In this embodiment of the present disclosure, the information exchange area is set, a device message sent by an electronic device in the information exchange area is synchronized to a TCU to be obtained after switching from a TCU existing before the switching, or a device message sent by an electronic device in the information exchange area is synchronized to a TCU existing before switching from a TCU obtained after the switching. This ensures completeness of a message used when a TCU performs risk analysis on an electronic device in a management and control area of the TCU.

Figure 5C:
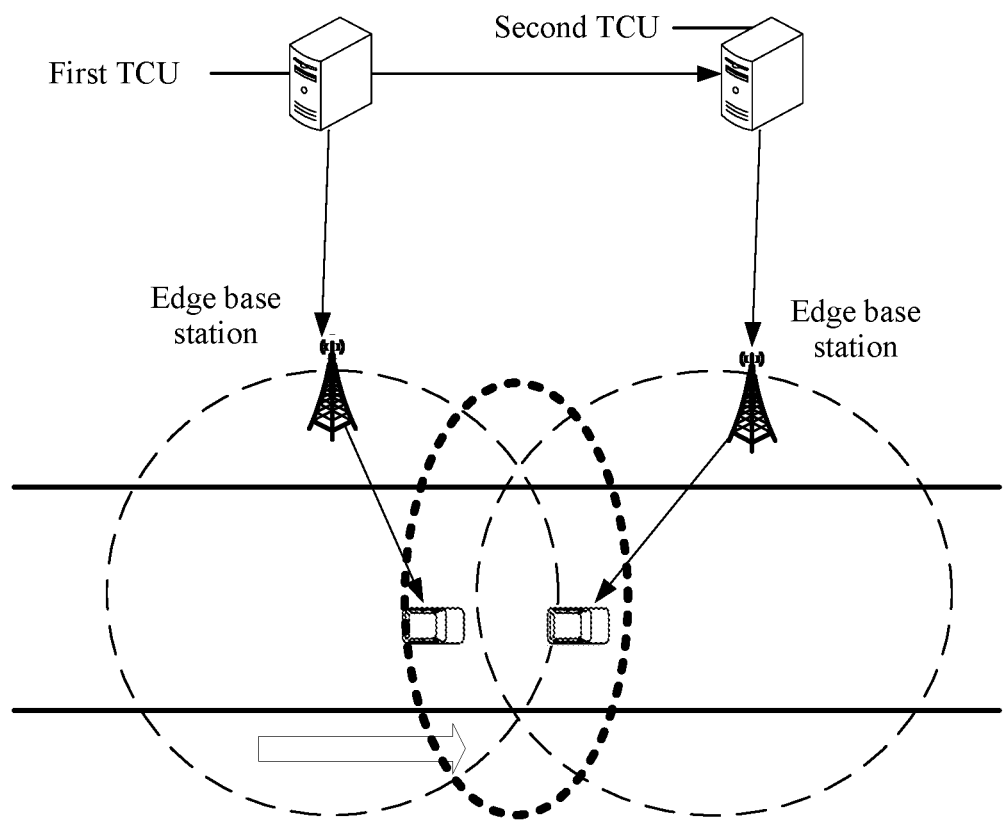
FIG. 5C is a schematic diagram of a downlink message processing process in star networking according to an embodiment of the present disclosure.

FIG. 7 is a flowchart of a message synchronization method according to an embodiment of the present disclosure. The message synchronization method is a message synchronization method for a downlink message in star networking. FIG. 5C is a schematic diagram of a downlink message processing process in star networking according to an embodiment of the present disclosure. Referring to FIG. 5C and FIG. 7, the message synchronization method includes the following steps.

701. A first TCU sends a driver assistant message to a second device in an information exchange area.

The driver assistant message includes an environment status message and a transaction message. When the second device is in the information exchange area, and the second device is in a management and control area of the first TCU, the first TCU sends a driver assistant message to the second device. The driver assistant message may be sent in a unicast manner or a broadcast manner. When the first TCU sends the driver assistant message to the second device, if the second device is still in the management and control area of the first TCU, the second device may receive the driver assistant message.

702. The first TCU sends the driver assistant message to a second TCU.

Because the second device is in the information exchange area, the first TCU may synchronously send the driver assistant message to the second TCU.

703. The second TCU receives the driver assistant message.

The second TCU receives the driver assistant message such that if the driver assistant message is not received when the second device is handed over to the second TCU, the driver assistant message may be sent to the second device using the second TCU.

704. When the second device is handed over to the second TCU, the second TCU sends the driver assistant message to the second device.

When a vehicle in which the second device is located travels from the management and control area of the first TCU to a management and control area of the second TCU, the second device is handed over from the first TCU to the second TCU, and the second TCU sends the driver assistant message to the second device such that when a TCU of the second device is switched, the driver assistant message sent by the second TCU may be received even if no driver assistant message sent by the first TCU is received.

In this embodiment of the present disclosure, in a TCU switching process, a transaction message is synchronized to a TCU to be obtained after switching, and after the switching, the TCU obtained after the switching sends the transaction message to an electronic device, thereby avoiding loss of the transaction message, and reducing a time during which a transaction may be interrupted in the switching process.

Figure 8A:
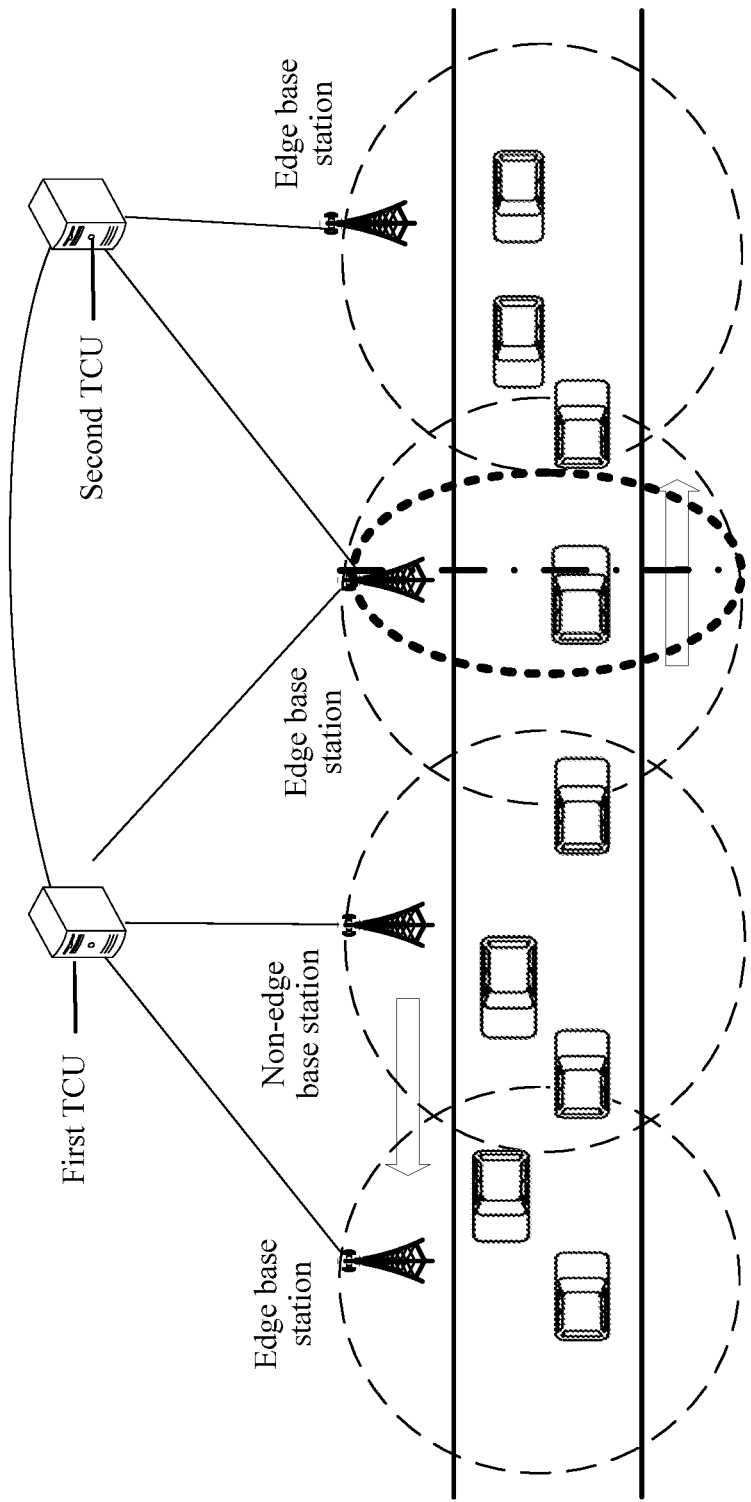
FIG. 8A is a schematic diagram of TCU deployment in M-shaped networking according to an embodiment of the present disclosure.

FIG. 8A is a schematic diagram of TCU deployment in M-shaped networking according to an embodiment of the present disclosure. In this embodiment of the present disclosure, referring to FIG. 8A, similar to star networking, each TCU may be connected to a plurality of base stations, and the plurality of base stations are classified into a non-edge base station and an edge base station. It should be noted that, in the M-shaped networking, a first TCU and a second TCU share the edge base station.

Different from the star networking provided in the embodiment shown in FIG. 5A, in this embodiment of the present disclosure, a boundary line is set in an information exchange area, to divide the information exchange area into a first sub-area and a second sub-area, where the first sub-area is a management and control area of the first TCU, and the second sub-area is a management and control area of the second TCU.

Likewise, both the first TCU and the second TCU can receive a device message sent by a first device in the information exchange area such that when the first device is handed over from management and control of the first TCU to management and control of the second TCU, completeness of a message used when the second TCU performs risk analysis on the first device can be ensured.

Different from that in the embodiments shown in FIG. 5A, FIG. 5B, FIG. 5C, FIG. 6, and FIG. 7, the information exchange area includes a part of an area, in a coverage area of the base station, that does not overlap a coverage area of another base station. The information exchange area is set outside an overlapping area between the coverage areas of the base stations, thereby avoiding a service discontinuity problem caused when the base station is switched.

Also, only an area in a vertical direction of a road is considered for setting the information exchange area, and an intersection road edge is used as a horizontal edge of the information exchange area. A size of the information exchange area in the vertical direction of the road may be determined based on a boundary line between the first sub-area and the second sub-area, a safety reaction time, and a road upper limit speed. For example, if the safety reaction time is 3 seconds, and the road upper limit speed is 120 kilometers/hour, the size of the information exchange area in the vertical direction of the road may be obtained by increasing, in the vertical direction of the road with reference to the boundary line between the first sub-area and the second sub-area, 100 meters, that is, a distance traveled within 3 seconds by a vehicle in which the first device is located. In an embodiment, the information exchange area may be further determined based on another factor. This is not limited in the present disclosure.

Figure 9A:
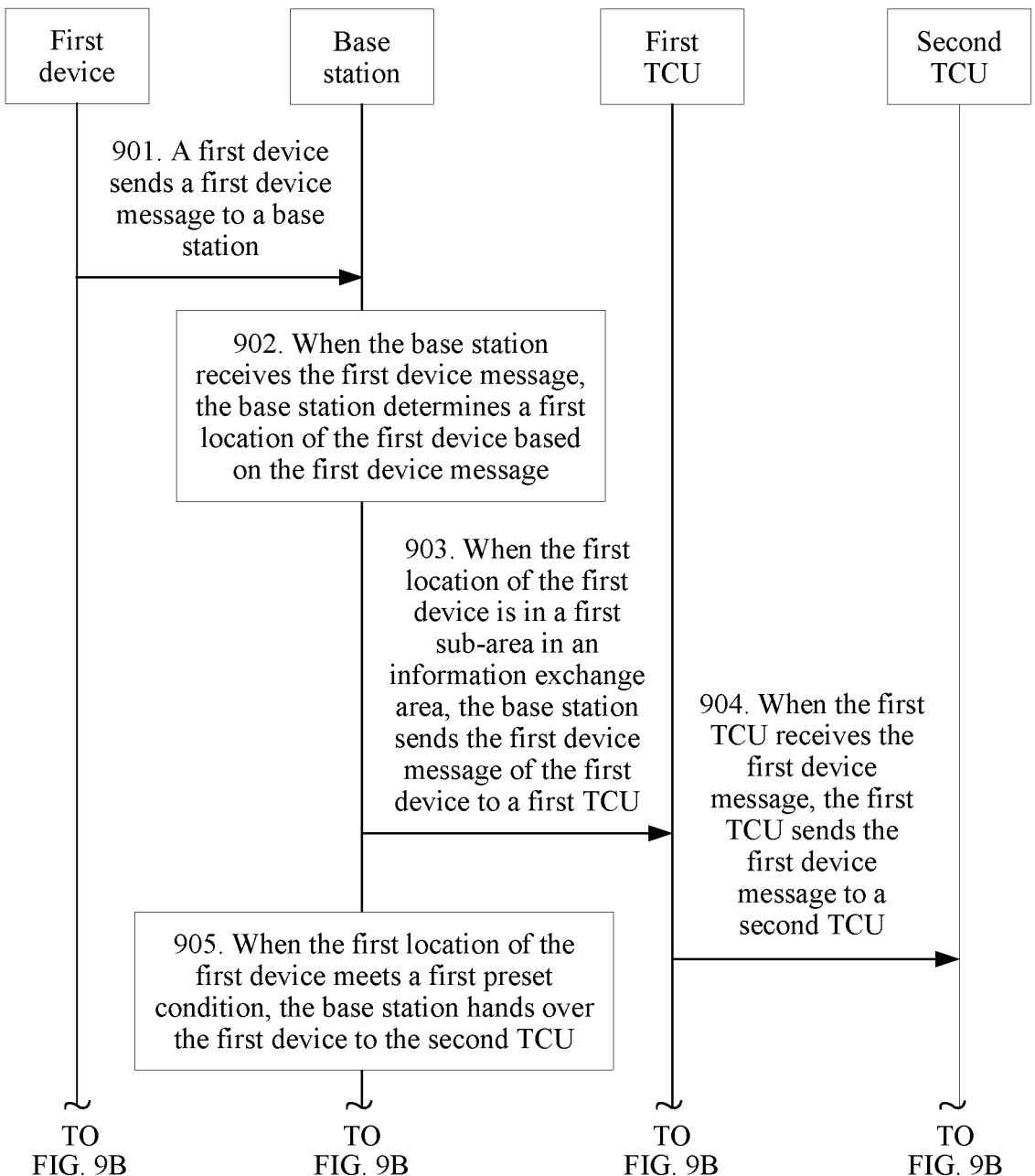
FIG. 9A is a flowchart of a TCU switching method according to an embodiment of the present disclosure.
Figure 9B:
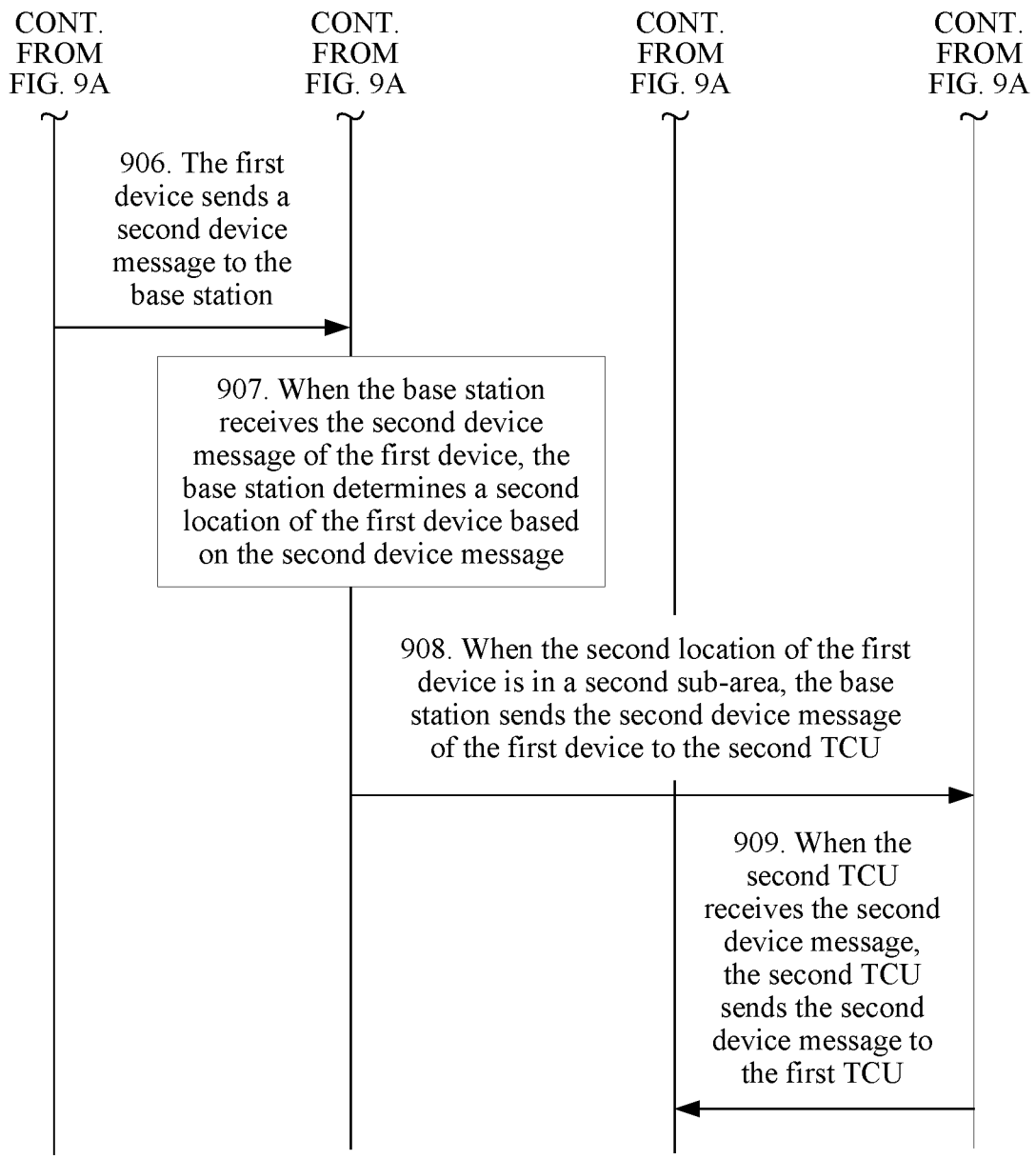
FIG. 9B is a flowchart of a TCU switching method according to an embodiment of the present disclosure.
Figure 10:
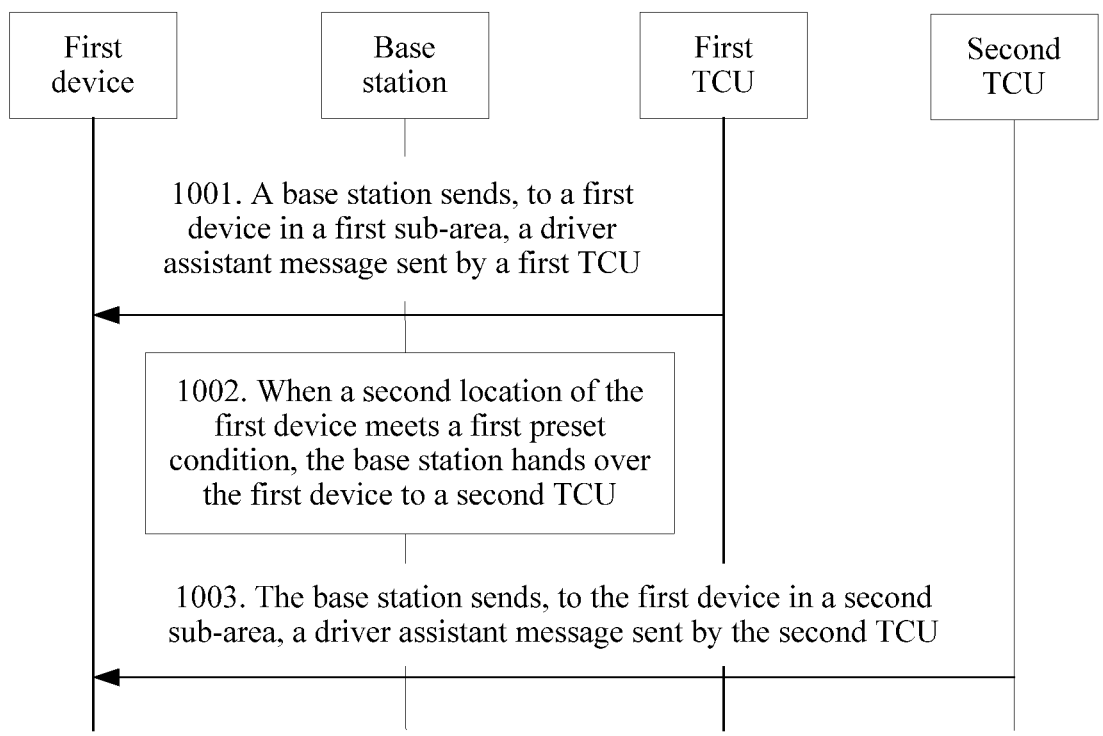
FIG. 10 is a flowchart of a TCU switching method according to an embodiment of the present disclosure.

The following separately describes, using embodiments shown in FIG. 9A and FIG. 9B and FIG. 10, a processing process for an uplink message before and after a TCU of an electronic device in the M-shaped networking in the embodiment shown in FIG. 8A is switched and a processing process for a downlink message before and after a TCU of an electronic device in the M-shaped networking in the embodiment shown in FIG. 8A is switched.

Figure 8B:
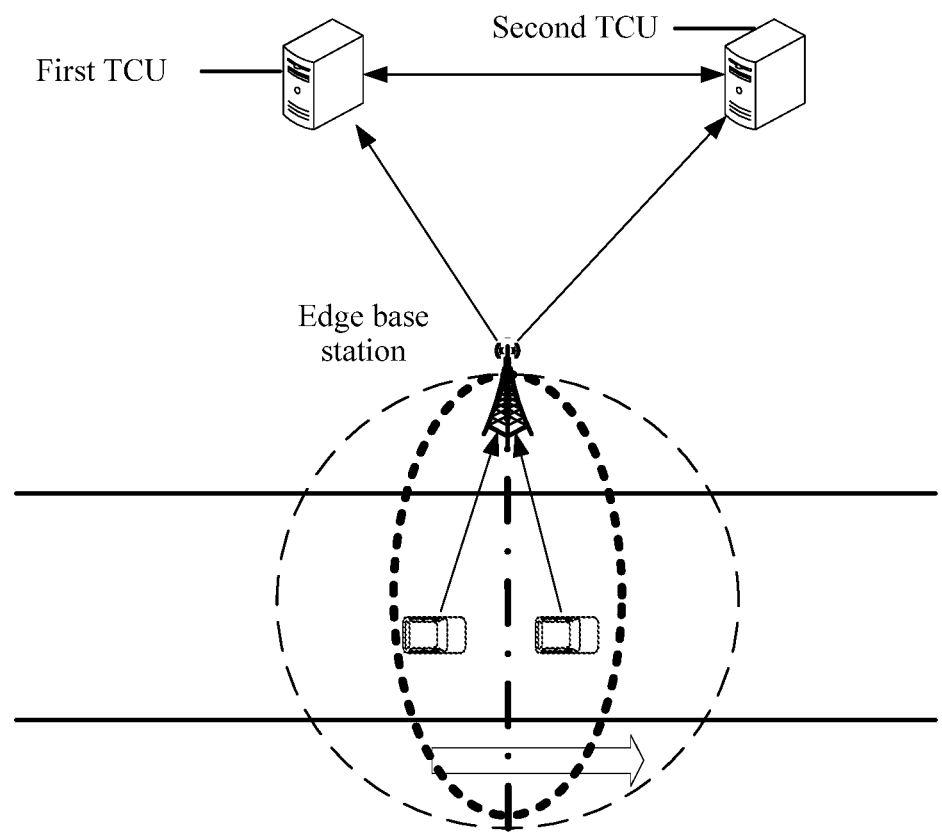
FIG. 8B is a schematic diagram of an uplink message processing process in M-shaped networking according to an embodiment of the present disclosure.

FIG. 9A and FIG. 9B are a flowchart of a TCU switching method according to an embodiment of the present disclosure. The TCU switching method relates to an uplink message processing method in M-shaped networking. FIG. 8B is a schematic diagram of an uplink message processing process in M-shaped networking according to an embodiment of the present disclosure. Referring to FIG. 8B and FIG. 9A and FIG. 9B, the TCU switching method is applied to a base station, and a first TCU and a second TCU share the base station. The method includes the following steps.

901. A first device sends a first device message to the base station.

902. When the base station receives the first device message, the base station determines a first location of the first device based on the first device message.

Step 901 and step 902 are similar to step 601 and step 602. A focus object of step 901 and step 902 is the base station, and a focus object of step 601 and step 602 is the first TCU. Details are not described herein again.

903. When the first location of the first device is in a first sub-area in an information exchange area, the base station sends the first device message of the first device to the first TCU.

When the first location of the first device is in the first sub-area in the information exchange area, the base station determines that a TCU to which the first device belongs is the first TCU, and sends the first device message of the first device to the first TCU, and the first TCU performs risk analysis on the first device.

904. When the first TCU receives the first device message, the first TCU sends the first device message to the second TCU.

When the first TCU receives the first device message, because the first device is in the information exchange area, the first TCU may further send the first device message to the second TCU such that both the first TCU and the second TCU can receive the first device message of the first device in the information exchange area.

In step 904, when the first TCU receives the first device message, the first device message may carry an indication message added by the base station, where the indication message is used to instruct the first TCU to send the first device message to the second TCU. In this case, the base station instructs the first TCU to perform message synchronization. In another possible design, the first TCU may further independently determine whether message synchronization needs to be performed. That is, step 904 may include, when the first TCU receives the first device message, determining, by the first TCU based on the first device message, whether the location of the first device is in the information exchange area, and when the first TCU determines that the location of the first device is in the information exchange area, sending the first device message to the second TCU.

Step 903 and step 904 are a process of sending the first device message of the first device to the first TCU and the second TCU when the first location of the first device is in the first sub-area in the information exchange area. In this process, the base station sends the device message only to the first TCU, and the first TCU performs a synchronization process. In a possible design, the base station may further perform the synchronization process, that is, when the first location of the first device is in the first sub-area in the information exchange area, the base station separately sends the first device message of the first device to the first TCU and the second TCU. It should be noted that, identification information of the TCU to which the first device belongs needs to be carried in a specific field of the first device needs, and the specific field is simultaneously sent to the first TCU and the second TCU using the base station such that a delay of forwarding from the first TCU to the second TCU can be reduced.

After receiving the first device message, the second TCU may also use the first device message of the first device as basis data for risk analysis when performing risk analysis on an electronic device in a management and control area of the second TCU.

905. When the first location of the first device meets a first preset condition, the base station hands over the first device to the second TCU.

The first preset condition may be that the first location is in a second sub-area in the information exchange area. When the first location of the first device meets the first preset condition, that is, when a vehicle in which the first device is located travels from the first sub-area to the second sub-area, the base station sends address information of the second TCU to the first device. When the first device receives the address information of the second TCU, the first device may send a registration message to the second TCU using the base station. The second TCU receives the registration message and responds to the registration message. When the first device completes registration at the second TCU, the base station switches the TCU of the first device to the second TCU. Certainly, the base station further sends a deregistration message to the first TCU. When receiving the deregistration message, the first TCU may respond to the deregistration message, and remove the first device from management and control device information of the first TCU.

In a possible design, a process in which the base station hands over the first device to the second TCU may be further as follows. The base station sends a notification message to the first TCU, where the notification message is used to instruct the first TCU to send authentication information of the first device to the second TCU, if the second TCU receives the authentication information of the first device, the second TCU achieves management and control over the first device, and when sending the notification message to the first TCU, the base station sends the address information of the second TCU to the first device in order to notify the first device of address information of the TCU to which the first device belongs.

In addition to the foregoing handover performed when the first device passes a boundary line between the sub-areas, because a transaction message is of emergency, and response to the transaction message also needs to be continuous, in a possible design, handover may be further advanced or delayed based on a transaction message sending and receiving status of the base station.

The advancing the handover may include the following process. When a message type of the first device message is a transaction message, the first preset condition may be that the first location of the first device is in the first sub-area, and a distance between the first location and the boundary line between the first sub-area and the second sub-area is less than a preset distance. The preset distance may be determined based on a system delay and a road upper limit speed. For example, when a message sent by the first device to the first base station is a transaction message, and a location of the first device is in the first sub-area, but the first device may quickly enter the second sub-area from the first sub-area at a general speed of the first device when approaching the boundary line between the first sub-area and the second sub-area and the first device currently sends a transaction message, to avoid impact caused by TCU switching on processing the transaction message, the base station may hand over the first device to the second TCU in advance such that the transaction message is sent to the second TCU, and the second TCU processes the transaction message.

The delaying the handover may include the following process. When the first location of the first device meets the first preset condition, but the message sending and receiving status of the base station still meets a second preset condition, the base station delays the handover. The second preset condition is that the base station has not received a response message of a transaction message reported by the first device in the first sub-area. For example, when the first device enters the second sub-area from the first sub-area, the first device has sent a transaction message to the first TCU, and no response message is returned. Therefore, a transaction corresponding to the transaction message is still in an incomplete state. To prevent the transaction from being interrupted by TCU switching of the first device, the base station may delay the handover until the base station receives a response message sent by the first TCU, and then the first device is handed over to the second TCU.

906. The first device sends a second device message to the base station.

907. When the base station receives the second device message of the first device, the base station determines a second location of the first device based on the second device message.

Step 906 and step 907 are similar to step 601 and step 602, step 605 and step 606, and step 901 and step 902. A focus object of step 906 and step 907, and a focus object of step 901 and step 902 are the base station, a focus object of step 601 and step 602 is the first TCU, and a focus object of step 605 and step 606 is the second TCU. Details are not described herein again.

908. When the second location of the first device is in a second sub-area, the base station sends the second device message of the first device to the second TCU.

When the second location of the first device is in the second sub-area in the information exchange area, the base station determines that the TCU to which the first device belongs is the second TCU, and sends the second device message of the first device to the second TCU, and the second TCU performs risk analysis on the second device.

909. When the second TCU receives the second device message, the second TCU sends the second device message to the first TCU.

Step 908 and step 909 are similar to step 605 and step 607, when receiving the second device message, the first TCU may also use the second device message as basis data for performing risk analysis on an electronic device in a management and control area of the first TCU.

When the vehicle in which the first device is located travels out of the information exchange area, if receiving a third device message of the first device, the second TCU no longer sends the third device message to the first TCU.

In this embodiment of the present disclosure, the information exchange area is set such that both the first TCU and the second TCU can receive a device message sent by an electronic device in the information exchange area, thereby ensuring completeness of a message used when the TCU of the first device is switched. In addition, the information exchange area may be set by bypassing a base station switching area such that the information exchange area may be precisely set based on a road and a traffic feature. In this embodiment of the present disclosure, technologies such as a handover advancing technology and a handover delaying technology are further used to ensure completeness of a transaction message, thereby ensuring traffic safety.

Figure 8C:
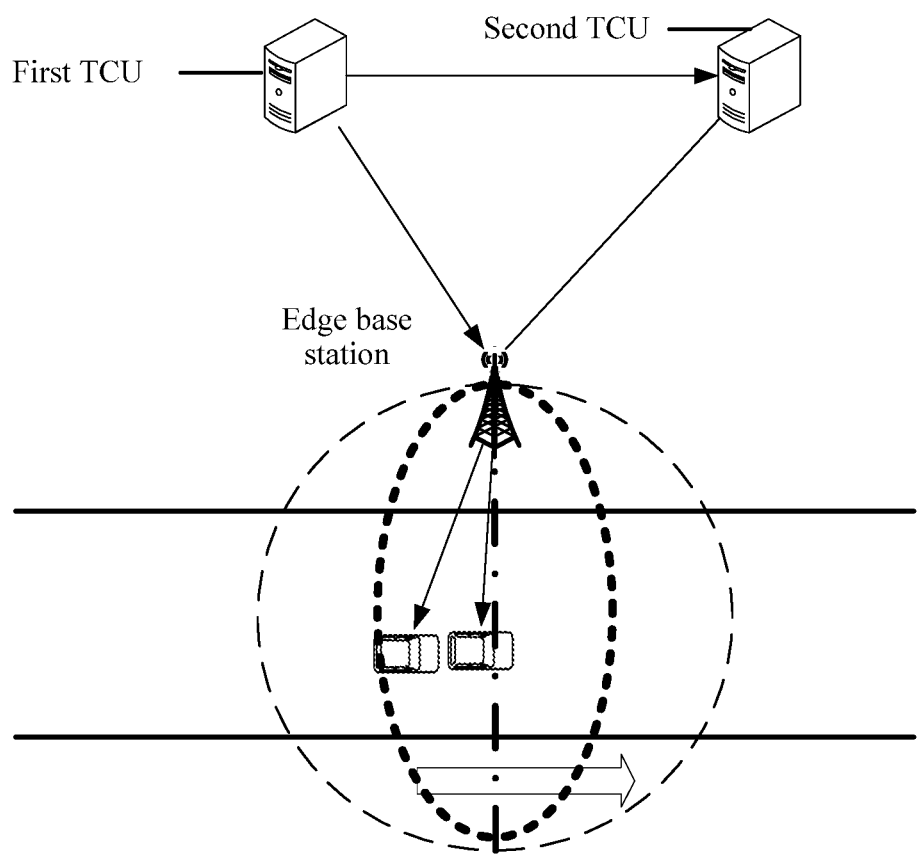
FIG. 8C is a schematic diagram of a downlink message processing process in M-shaped networking according to an embodiment of the present disclosure.

FIG. 10 is a flowchart of a TCU switching method according to an embodiment of the present disclosure. The TCU switching method is a downlink message processing procedure in M-shaped networking. FIG. 8C is a schematic diagram of a downlink message processing process in M-shaped networking according to an embodiment of the present disclosure. Referring to FIG. 8C and FIG. 10, the TCU switching method is applied to a base station, and a first TCU and a second TCU share the base station. The method includes the following steps.

1001. The base station sends, to a first device in a first sub-area, a driver assistant message sent by the first TCU.

Step 1001 is similar to step 701. The first TCU sends the driver assistant message to the first device in the first sub-area using the base station. Details are not described herein again.

1002. When a second location of the first device meets a first preset condition, the base station hands over the first device to the second TCU.

Step 1002 is similar to step 905, and the first preset condition is that the second location is in a second sub-area in an information exchange area. The TCU switching process is performed based on an uplink message in step 905. The first device periodically sends a device message to the base station. When the base station receives a device message of the first device, a location of the first device may be determined. When a vehicle in which the first device is located travels from the first sub-area to the second sub-area, the base station hands over the first device to the second TCU.

In addition to the foregoing handover performed when the first device passes a boundary line between the sub-areas, because a transaction message is of emergency, and response to the transaction message also needs to be continuous, in a possible design, handover delaying or message masquerading may be further performed based on a transaction message sending and receiving status of the base station.

The delaying the handover may include the following process. When the second location of the first device meets the first preset condition, but the message sending and receiving status of the base station still meets a second preset condition, the base station delays the handover. The second preset condition is that the base station has not sent, to the first device, a received transaction message sent by the first TCU. For example, when the vehicle in which the first device is located travels from the first sub-area to the second sub-area, if the base station receives the driver assistant message sent by the first TCU, and has not sent the driver assistant message to the first device, the base station may first not hand over the first device to the second TCU until the driver assistant message is sent to the first device, and then the base station hands over the first device to the second TCU.

The message masquerading may include the following process. When the second location of the first device meets the first preset condition, after the base station hands over the first device to the second TCU, the base station receives a transaction message sent by the first TCU, may modify a message source of the transaction message to the second TCU, and send the modified transaction message to the first device. For example, when the first device is handed over to the second TCU, the first TCU happens to have a transaction message that needs to be sent to the first device. To avoid loss of the transaction message, the base station may use the transaction message as a transaction message sent by the second TCU, and send the transaction message to the first device.

1003. The base station sends, to the first device in a second sub-area, a driver assistant message sent by the second TCU.

When the first device is handed over to the second TCU, the second TCU may send the driver assistant message to the first device using the base station.

When the first device travels out of the second sub-area, if the first device is in a management and control area of the second TCU, the second TCU may send a driver assistant message to the first device using the base station managed by the second TCU.

In this embodiment of the present disclosure, technologies such as a handover delaying technology and a message masquerading technology are used when a TCU is switched such that timely arrival of a transaction message is ensured, and an arrival delay is not generated.

Figure 11A:
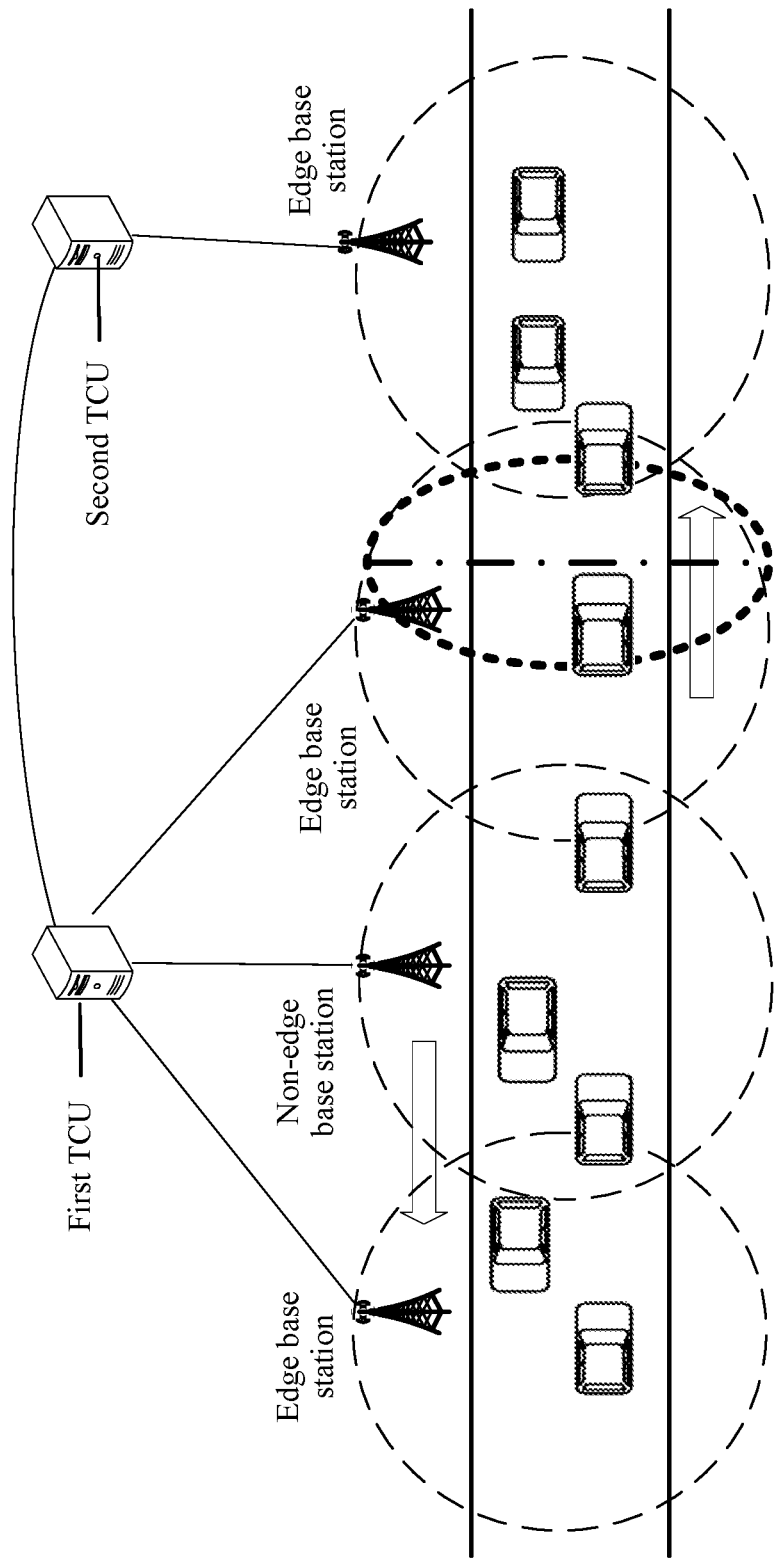
FIG. 11A is a schematic diagram of TCU deployment in star networking according to an embodiment of the present disclosure.

FIG. 11A is a schematic diagram of TCU deployment in star networking according to an embodiment of the present disclosure. A connection status between a base station and a first TCU and a connection status between the first TCU and a second TCU are similar to those in the embodiment shown in FIG. 5A.

Different from a setting of the information exchange area provided in the embodiment shown in FIG. 5A, in this embodiment of the present disclosure, a boundary line is set in an information exchange area, to divide the information exchange area into a first sub-area and a second sub-area, where the first sub-area is a management and control area of the first TCU, and the second sub-area is a management and control area of the second TCU. The information exchange area may be the information exchange area provided in the embodiment shown in FIG. 5A, or may be the information exchange area provided in the embodiment shown in FIG. 8A. That is, the information exchange area includes a part of an area, in a coverage area of an edge base station, that does not overlap a coverage area of another base station. Alternatively, the information exchange area includes at least an overlapping area between a coverage area of an edge base station of the first TCU and a coverage area of an edge base station of the second TCU.

Figure 12A:
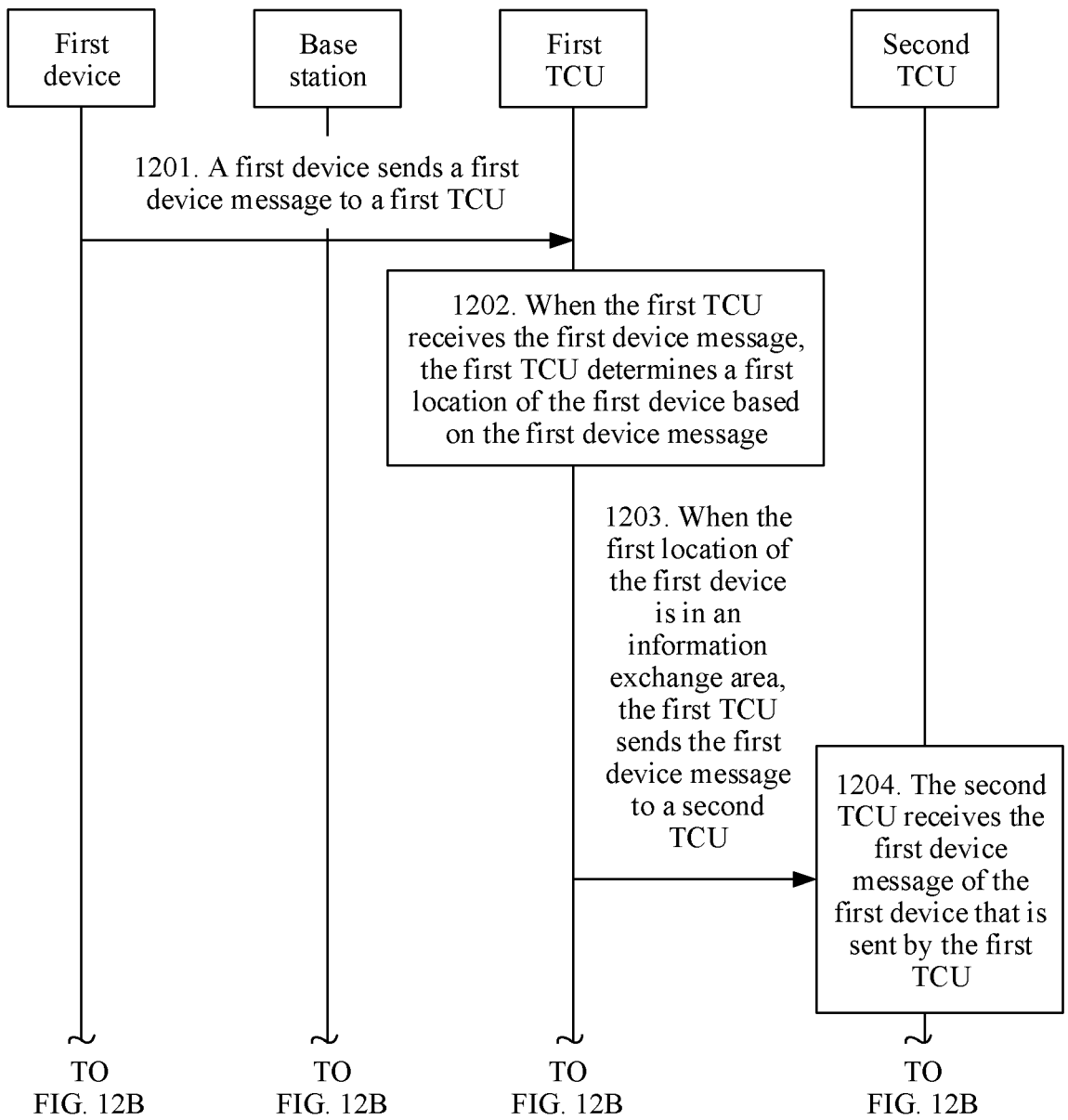
FIG. 12A is a flowchart of a TCU switching method according to an embodiment of the present disclosure.
Figure 12B:
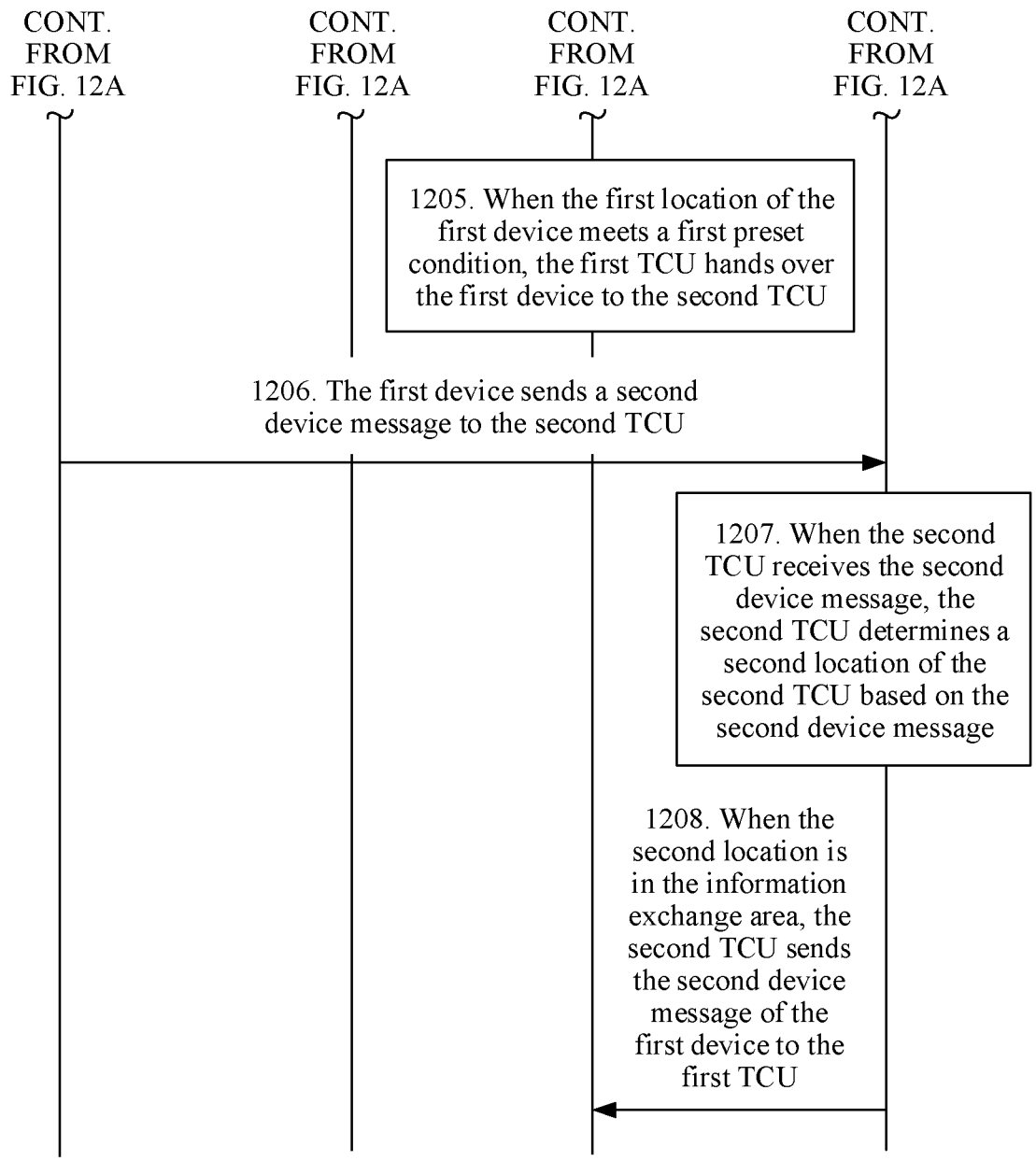
FIG. 12B is a flowchart of a TCU switching method according to an embodiment of the present disclosure.
Figure 13:
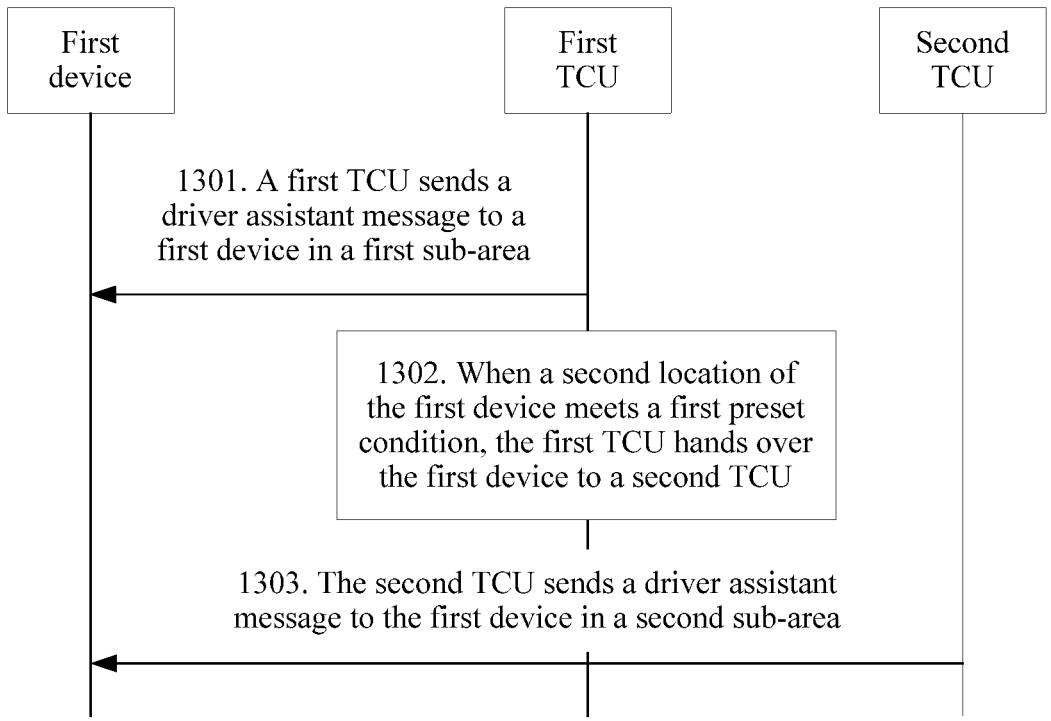
FIG. 13 is a flowchart of a TCU switching method according to an embodiment of the present disclosure.

The following separately describes, using embodiments shown in FIG. 12A and FIG. 12B and FIG. 13, a processing process for an uplink message before and after a TCU of an electronic device in the star networking in the embodiment shown in FIG. 11A is switched and a processing process for a downlink message before and after a TCU of an electronic device in the star networking in the embodiment shown in FIG. 11A is switched.

Figure 11B:
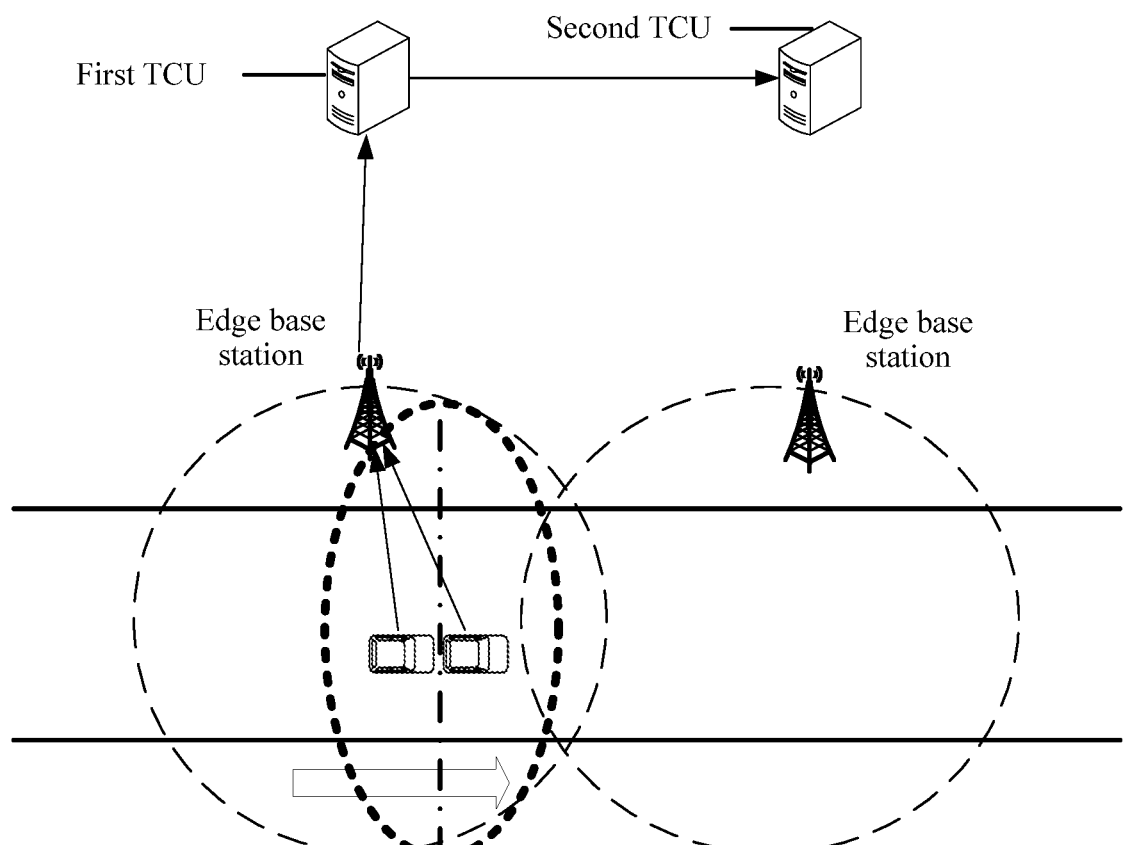
FIG. 11B is a schematic diagram of an uplink message processing process in star networking according to an embodiment of the present disclosure.

FIG. 12A and FIG. 12B are a flowchart of a TCU switching method according to an embodiment of the present disclosure. The TCU switching method relates to an uplink message processing method in star networking. FIG. 11B is a schematic diagram of an uplink message processing process in star networking according to an embodiment of the present disclosure. Referring to FIG. 11B and FIG. 12A and FIG. 12B, the TCU switching method includes the following steps.

1201. A first device sends a first device message to a first TCU.

1202. When the first TCU receives the first device message, the first TCU determines a first location of the first device based on the first device message.

1203. When the first location of the first device is in an information exchange area, the first TCU sends the first device message to a second TCU.

1204. The second TCU receives the first device message of the first device that is sent by the first TCU.

Step 1201 to step 1204 are similar to step 601 to step 604. Details are not described herein again.

1205. When the first location of the first device meets a first preset condition, the first TCU hands over the first device to the second TCU.

Step 1205 is similar to step 905. However, when handing over the first device to the second TCU, the first TCU may send authentication information of the first device to the second TCU. After the second TCU receives the authentication information and returns an acknowledgement message, a process of handing over the first device to the second TCU is completed.

In addition to the foregoing handover performed when the first device passes a boundary line between sub-areas, in consideration of continuity of a transaction message, handover may be further advanced or delayed based on a message type of the device message and a location of the device.

The advancing the handover may include the following process. When the message type of the first device message is a transaction message, the first preset condition may be that the first location is in a first sub-area, and a distance between the first location and a boundary line between the first sub-area and a second sub-area is less than a preset distance. The preset distance may be determined based on a system delay and a road upper limit speed.

The delaying the handover may include the following process. When the first location of the first device meets the first preset condition, but a message sending and receiving status of the first TCU meets a third preset condition, the first TCU may delay the handover. The third preset condition may be that the first TCU has not responded to a transaction message reported by the first device in the first sub-area. For example, when the first device reports the transaction message in the first sub-area, the first TCU has not responded to the transaction message, and a vehicle in which the first device is located travels from the first sub-area to the second sub-area, the first TCU delays the handover. After responding to the transaction message, the first TCU hands over the first device to the second TCU.

1206. The first device sends a second device message to the second TCU.

1207. When the second TCU receives the second device message, the second TCU determines a second location of the first device based on the second device message.

1208. When the second location is in the information exchange area, the second TCU sends the second device message of the first device to the first TCU.

Step 1206 to step 1208 are similar to step 605 to step 607. Details are not described herein again.

It should be noted that, when the first device is handed over to the second TCU, after receiving the device message sent by the first device, the first TCU may forward the device message to the second TCU until the vehicle in which the first device is located travels out a coverage area of a base station of the first TCU. Then, the first TCU no longer receives the device message of the first device, and therefore does not need to forward the device message to the second TCU.

When the vehicle in which the first device is located travels out of the information exchange area, if receiving a third device message of the first device, the second TCU no longer sends the third device message to the first TCU.

In this embodiment of the present disclosure, the information exchange area is set, a device message sent by an electronic device in the information exchange area is synchronized to a TCU to be obtained after switching from a TCU existing before the switching, or a device message sent by an electronic device in the information exchange area is synchronized to a TCU existing before switching from a TCU obtained after the switching. This ensures completeness of a message used when a TCU performs risk analysis on an electronic device in a management and control area of the TCU. In addition, in this embodiment of the present disclosure, a transaction message sent by the first device is processed using technologies such as a handover advancing technology and a handover delaying technology, ensuring transaction completeness and traffic safety.

Figure 11C:
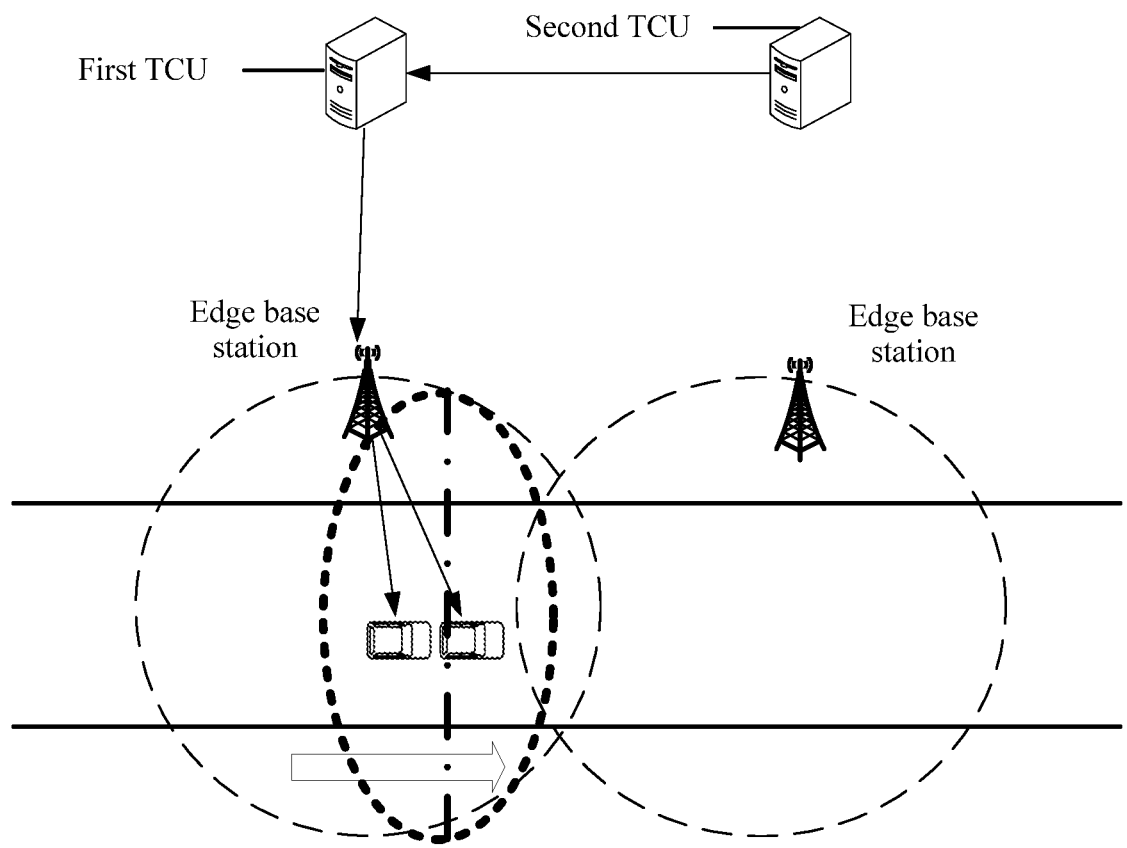
FIG. 11C is a schematic diagram of a downlink message processing process in star networking according to an embodiment of the present disclosure.

FIG. 13 is a flowchart of a TCU switching method according to an embodiment of the present disclosure. The TCU switching method is a downlink message processing procedure in star networking. FIG. 11C is a schematic diagram of a downlink message processing process in star networking according to an embodiment of the present disclosure. Referring to FIG. 11C and FIG. 13, the TCU switching method includes the following steps.

1301. A first TCU sends a driver assistant message to a first device in a first sub-area.

Step 1301 is similar to step 1001. Details are not described herein again.

1302. When a second location of the first device meets a first preset condition, the first TCU hands over the first device to a second TCU.

Similar to step 1002, the first preset condition may be that the second location is in a second sub-area.

In this step, in addition to the foregoing handover performed when the first device passes a boundary line between the sub-areas, when the driver assistant message is a transaction message, handover may be further advanced or delayed based on a message sending and receiving status of the first TCU.

The advancing the handover may include the following process. The first preset condition may be that the second location is in the first sub-area, and a distance between the second location and a boundary line between the first sub-area and the second sub-area is less than a preset distance. The preset distance may be determined based on a system delay and a road upper limit speed. The first TCU has a transaction message to be sent to the first device. For example, when a vehicle in which the first device is located is about to travel from the first sub-area to the second sub-area, the first TCU has a transaction message to be sent to the first device. To ensure completeness of the transaction message, the first TCU may hand over the first device to the second TCU in advance, send the transaction message to the first device, and send the transaction message to the second TCU such that the second TCU processes a subsequent transaction of the transaction message.

The delaying the handover may include the following process. When the second location of the first device meets the first preset condition, but the message sending and receiving status of the first TCU meets a third preset condition, the first TCU delays the handover. The third preset condition may be that the first TCU has a transaction message to be sent to the first device. For example, when the vehicle in which the first device is located travels from the first sub-area to the second sub-area, the first TCU has a transaction message to be sent, the first TCU may delay handover to ensure completeness of the transaction message received by the first device. After the first TCU sends the transaction message to the first device, the first TCU hands over the first device to the second TCU.

1303. The second TCU sends a driver assistant message to the first device in a second sub-area.

Step 1303 is similar to step 1003. Details are not described herein again.

In this embodiment of the present disclosure, during TCU switching, technologies such as a handover advancing technology and a handover delaying technology are used to ensure completeness of a transaction message, and a time of delivering the transaction message is not prolonged. Further, in this embodiment of the present disclosure, a TCU determines a TCU to which the first device belongs in order to determine whether to perform TCU switching. In an embodiment, a change to a base station is very small, facilitating deployment.

Figure 14:
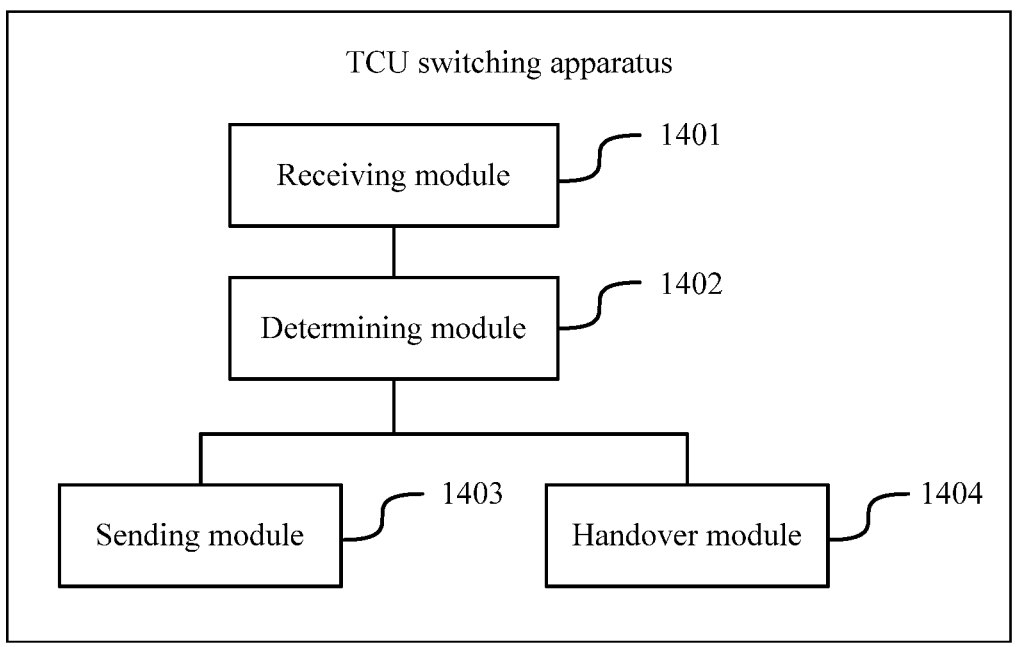
FIG. 14 is a schematic structural diagram of a TCU switching apparatus according to an embodiment of the present disclosure.

FIG. 14 is a schematic structural diagram of a TCU switching apparatus according to an embodiment of the present disclosure. The apparatus is applied to a first TCU, the first TCU is connected to a base station, a management and control area of the first TCU includes a first sub-area in an information exchange area, a management and control area of a second TCU includes a second sub-area in the information exchange area, and the second TCU is a neighboring TCU of the first TCU in a traveling direction of a vehicle in which a first device is located. The apparatus includes a receiving module 1401 configured to receive a first device message of the first device, a determining module 1402 configured to determine a first location of the first device based on the first device message, a sending module 1403 configured to, when the first location of the first device is in the information exchange area, send the first device message of the first device to the second TCU, and a handover module 1404 configured to, when the first location of the first device meets a first preset condition, hand over the first device to the second TCU.

In a possible design, the first preset condition is that the first location is in the second sub-area.

In a possible design, when a message type of the first device message is a transaction message, the first preset condition is that the first location is in the first sub-area, and a distance between the first location and a boundary line between the first sub-area and the second sub-area is less than a preset distance.

In a possible design, the first preset condition is that the first location is in the first sub-area, and a distance between the first location and a boundary line between the first sub-area and the second sub-area is less than a preset distance, and the first TCU has a transaction message to be sent to the first device.

In a possible design, the handover module 1404 is further configured to delay handover when the first location of the first device meets the first preset condition, but a message sending and receiving status of the first TCU meets a third preset condition.

In a possible design, the third preset condition is that the first TCU has not responded to a transaction message reported by the first device in the first sub-area.

In a possible design, the third preset condition is that the first TCU has a transaction message to be sent to the first device.

In a possible design, the information exchange area is determined based on a risk analysis requirement.

In a possible design, the information exchange area includes a part of an area, in a coverage area of the base station, that does not overlap a coverage area of another base station, or the information exchange area includes at least an overlapping area between a coverage area of an edge base station of the first TCU and a coverage area of an edge base station of the second TCU.

Figure 15:
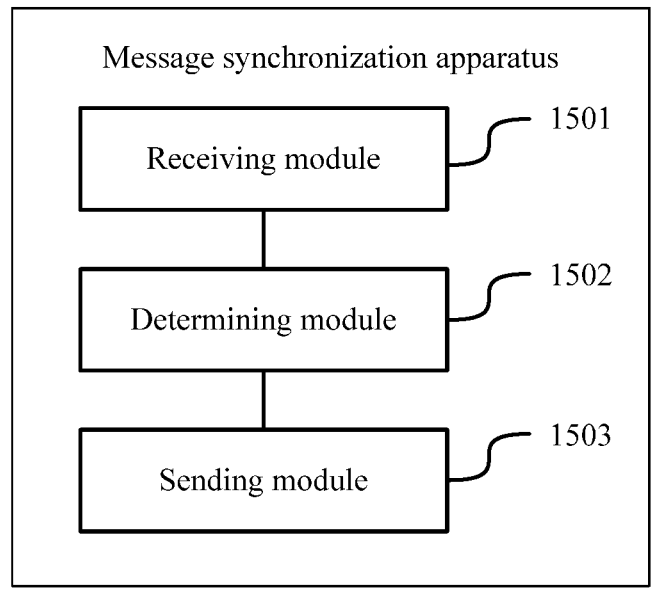
FIG. 15 is a schematic structural diagram of a message synchronization apparatus according to an embodiment of the present disclosure.

FIG. 15 is a schematic structural diagram of a message synchronization apparatus according to an embodiment of the present disclosure. The apparatus is applied to a first TCU, and includes a receiving module 1501 configured to receive a first device message of a first device, a determining module 1502 configured to determine a location of the first device based on the first device message, a sending module 1503 configured to, when the location of the first device is in an information exchange area, send the first device message of the first device to a second TCU, where the second TCU is a neighboring TCU of the first TCU in a traveling direction of a vehicle in which the first device is located.

In a possible design, the receiving module 1501 is further configured to, when the first device is handed over to the second TCU, receive a second device message of the first device that is sent by the second TCU, where the second device message of the first device is sent by the first device in the information exchange area.

In a possible design, the information exchange area is determined based on a risk analysis requirement.

In a possible design, the information exchange area includes at least an overlapping area between a coverage area of an edge base station of the first TCU and a coverage area of an edge base station of the second TCU.

Figure 16:
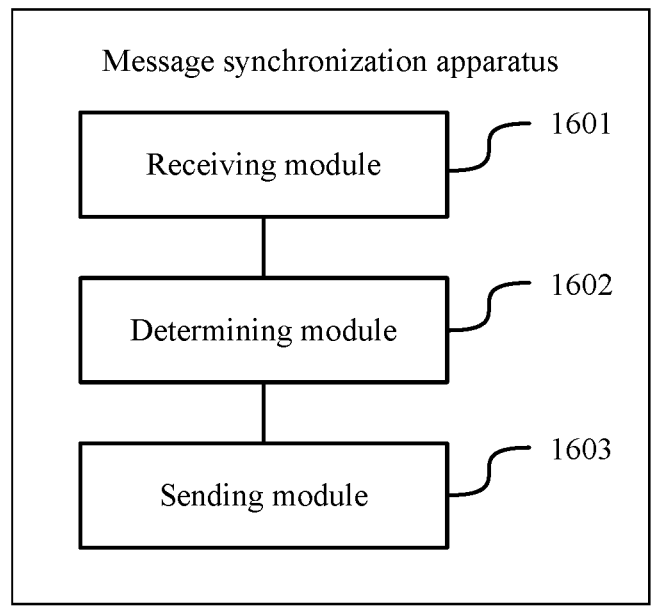
FIG. 16 is a schematic structural diagram of a message synchronization apparatus according to an embodiment of the present disclosure.

FIG. 16 is a schematic structural diagram of a message synchronization apparatus according to an embodiment of the present disclosure. The apparatus is applied to a second TCU, and includes a receiving module 1601 configured to receive a first device message of a first device that is sent by a first TCU, where the receiving module 1601 is further configured to receive a second device message of the first device when the first device is handed over to the second TCU, a determining module 1602 configured to determine a location of the first device based on the second device message, and a sending module 1603 configured to, when the location of the first device is in an information exchange area, send the second device message of the first device to the first TCU, where the first TCU is a TCU connected to the first device before TCU switching is performed.

In a possible design, the information exchange area is determined based on a risk analysis requirement.

In a possible design, the information exchange area includes at least an overlapping area between a coverage area of an edge base station of the first TCU and a coverage area of an edge base station of the second TCU.

Figure 17:
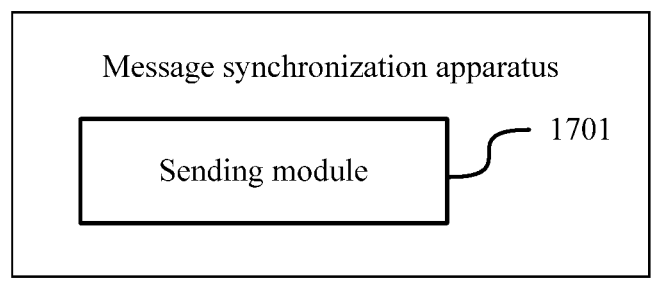
FIG. 17 is a schematic structural diagram of a message synchronization apparatus according to an embodiment of the present disclosure.

FIG. 17 is a schematic structural diagram of a message synchronization apparatus according to an embodiment of the present disclosure. The apparatus is applied to a first TCU, and includes a sending module 1701 configured to send a driver assistant message to a second device in an information exchange area, where the driver assistant message includes an environment status message and a transaction message, where the sending module 1701 is further configured to send the driver assistant message to a second TCU, where the second TCU is a neighboring TCU of the first TCU in a traveling direction of a vehicle in which the second device is located, and the second TCU sends the driver assistant message to the second device when the second device is handed over to the second TCU.

In a possible design, the driver assistant message is sent in a unicast manner or a broadcast manner.

In a possible design, the information exchange area is determined based on a risk analysis requirement.

In a possible design, the information exchange area includes at least an overlapping area between a coverage area of an edge base station of the first TCU and a coverage area of an edge base station of the second TCU.

Figure 18:
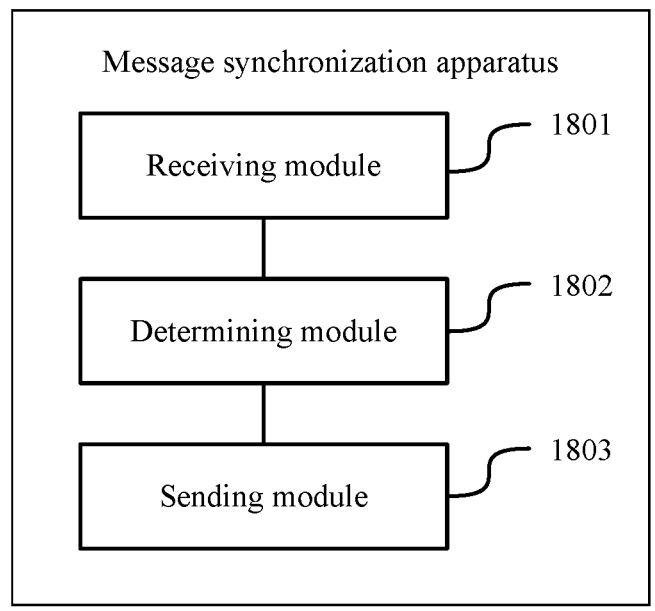
FIG. 18 is a schematic structural diagram of a message synchronization apparatus according to an embodiment of the present disclosure.

FIG. 18 is a schematic structural diagram of a message synchronization apparatus according to an embodiment of the present disclosure. The apparatus is applied to a second TCU, and includes a receiving module 1801 configured to receive a driver assistant message sent by a first TCU, where a target device of the driver assistant message is a second device in an information exchange area, and the driver assistant message includes an environment status message and a transaction message, where the receiving module 1801 is further configured to receive a device message of the second device when the second device is handed over to the second TCU, a determining module 1802 configured to determine a location of the first device based on the device message, and a sending module 1803 configured to, when the location of the second device is in the information exchange area, send the driver assistant message to the second device.

In a possible design, the driver assistant message is sent in a unicast manner or a broadcast manner.

In a possible design, the information exchange area is determined based on a risk analysis requirement.

In a possible design, the information exchange area includes at least an overlapping area between a coverage area of an edge base station of the first TCU and a coverage area of an edge base station of the second TCU.

Figure 19:
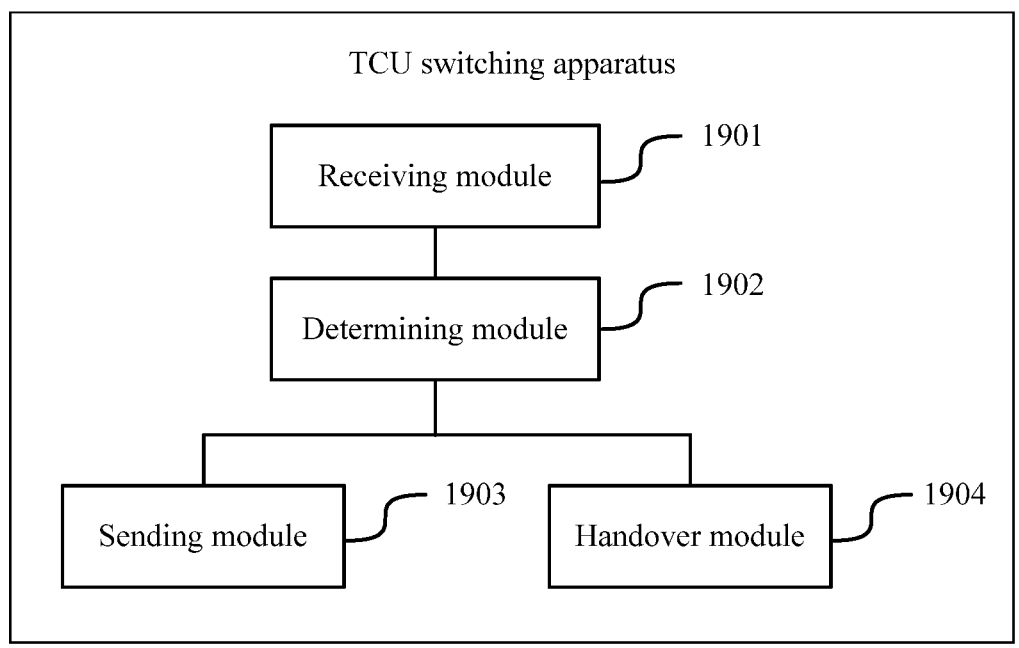
FIG. 19 is a schematic structural diagram of a TCU switching apparatus according to an embodiment of the present disclosure.

FIG. 19 is a schematic structural diagram of a TCU switching apparatus according to an embodiment of the present disclosure. The apparatus is applied to a base station, a first TCU and a second TCU share the base station, and the apparatus includes a receiving module 1901 configured to receive a first device message of a first device, a determining module 1902 configured to determine a first location of the first device based on the first device message, a sending module 1903 configured to, when the first location of the first device is in a first sub-area in an information exchange area, send the first device message of the first device to the first TCU and the second TCU, where the first sub-area is a management and control area of the first TCU, and the second TCU is a neighboring TCU of the first TCU in a traveling direction of a vehicle in which the first device is located, and a handover module 1904 configured to, when the first location of the first device meets a first preset condition, hand over the first device to the second TCU.

In a possible design, the first preset condition is that the first location is in a second sub-area in the information exchange area, and the second sub-area is a management and control area of the second TCU.

In a possible design, when a message type of the first device message is a transaction message, the first preset condition is that the first location is in the first sub-area, and a distance between the first location and a boundary line between the first sub-area and a second sub-area is less than a preset distance.

In a possible design, the handover module 1904 is further configured to delay handover when the first location of the first device meets the first preset condition, but a message sending and receiving status of the base station meets a second preset condition.

In a possible design, the second preset condition is that the base station has not received a response message of a transaction message reported by the first device in the first sub-area.

In a possible design, the second preset condition is that the base station has not sent, to the first device, a received transaction message sent by the first TCU.

In a possible design, after the first device is handed over to the second TCU, the receiving module 1901 is further configured to receive a transaction message sent by the first TCU, and the sending module 1903 is further configured to modify a message source of the transaction message to the second TCU, and send the modified transaction message to the first device.

In a possible design, the sending module 1903 is configured to perform step 903 and step 904.

In a possible design, after the first device is handed over to the second TCU, the receiving module 1901 and the determining module 1902 are further configured to perform step 907.

The sending module 1903 is further configured to, when the second location of the first device is in the second sub-area, send the second device message of the first device to the second TCU and the first TCU.

In a possible design, the sending module 1903 is configured to perform step 908 and step 909.

In a possible design, the information exchange area is determined based on a risk analysis requirement.

In a possible design, the information exchange area includes a part of an area, in a coverage area of the base station, that does not overlap a coverage area of another base station.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely optional embodiments of the present disclosure, but are not intended to limit the present disclosure. Any modification, equivalent replacement, or improvement made without departing from the spirit and principle of the present disclosure shall fall within the protection scope of the present disclosure.

What is claimed is:

1. A transportation control unit (TCU) switching method, implemented by a first TCU connected to a base station, wherein the TCU switching method comprises: receiving, by the first TCU, a first device message directly from a first device located in a vehicle; determining a first location of the first device based on the first device message; sending the first device message to a second TCU in response to determining the first location is in an information exchange area, wherein the information exchange area represents an area used for communication with at least one TCU and includes environment conditions in a traveling direction of the vehicle, wherein the first TCU is associated with a first management and control area, wherein the first management and control area comprises a first sub-area in the information exchange area and includes a coverage area of a communication device connected to the first TCU, wherein the second TCU is a neighbor TCU to the first TCU in the traveling direction of the vehicle, wherein the second TCU is associated with a second management and control area, and wherein the second management and control area comprises a second sub-area in the information exchange area; determining a preset distance based on a communication delay between the vehicle and at least one of the first TCU or the second TCU, and a speed limit of the first location; and handing over the first device to the second TCU in response to determining the first location meets a first preset condition, wherein the first preset condition is that the first location is in the first sub-area and a distance between the first location and a boundary line between the first sub-area and the second sub-area is less than the preset distance in response to a message type of the first device message being a transaction message.

2. The TCU switching method of claim 1, further comprising handing over the first device to the second TCU when the first preset condition further comprises that the first TCU has a transaction message to send to the first device.

3. The TCU switching method of claim 1, further comprising delaying handover when the first location of the first device meets the first preset condition and a message sending and receiving status of the first TCU meets a third preset condition.

4. The TCU switching method of claim 3, wherein the third preset condition is that the first TCU has not responded to a transaction message from the first device in the first sub-area.

5. The TCU switching method of claim 3, wherein the third preset condition is that the first TCU has a transaction message to send to the first device.

6. The TCU switching method of claim 1, wherein the information exchange area is based on a risk analysis requirement.

7. The TCU switching method of claim 1, wherein the information exchange area comprises a part of a coverage area of the base station that does not overlap with a coverage area of another base station or the information exchange area comprises at least an overlapping area between a coverage area of an edge base station of the first TCU and a coverage area of an edge base station of the second TCU.

8. A message synchronization method, implemented by a first transportation control unit (TCU), wherein the message synchronization method comprises: receiving, by the first TCU, a first device message directly from a first device located in a vehicle; determining a location of the first device based on the first device message; sending the first device message of the first device to a second TCU in response to determining the location of the first device is in an information exchange area, wherein the information exchange area represents an area used for communication with at least one TCU and includes environment conditions in a traveling direction of the vehicle, and wherein the second TCU is a neighbor TCU of the first TCU in the traveling direction of the vehicle; determining a preset distance based on a communication delay between the vehicle and at least one of the first TCU or the second TCU, and a speed limit of the location; and handing over the first device to the second TCU in response to determining the location meets a first preset condition, wherein the first preset condition is that the location is in a first sub-area and a distance between the location and a boundary line between the first sub-area and a second sub-area is less than the preset distance in response to a message type of the first device message being a transaction message.

9. The message synchronization method of claim 8, further comprising receiving a second device message of the first device from the second TCU when the first device is handed over to the second TCU, wherein the second device message of the first device is received from the first device in the information exchange area.

10. The message synchronization method of claim 8, wherein the information exchange area is based on a risk analysis requirement.

11. The message synchronization method of claim 8, wherein the information exchange area comprises at least an overlapping area between a first coverage area of a first edge base station of the first TCU and a second coverage area of a second edge base station of the second TCU.

12. The message synchronization method of claim 8, further comprising handing over the first device when the first preset condition further comprises the first TCU has a transaction message to send to the first device.

13. The message synchronization method of claim 8, further comprising delaying handover when the location of the first device meets the first preset condition and a message sending and receiving status of the first TCU meets a third preset condition.

14. A transportation control unit (TCU) switching apparatus of a first TCU, comprising: a processor; and a memory coupled to the processor and storing instructions that, when executed by the processor, cause the TCU switching apparatus to be configured to: receive, by the first TCU, a first device message directly from a first device located in a vehicle; determine a first location of the first device based on the first device message; send the first device message of the first device to a second TCU when the first location is in an information exchange area, wherein the information exchange area represents an area used for communication with at least one TCU and includes environment conditions in a traveling direction of the vehicle, wherein the first TCU is associated with a first management and control area, wherein the first management and control area comprises a first sub-area in the information exchange area and includes a coverage area of a communication device connected to the first TCU, and wherein the second TCU is a neighbor TCU to the first TCU in the traveling direction of the vehicle, wherein the second TCU is associated with a second management and control area, and wherein the second management and control area comprises a second sub-area in the information exchange area; determine a preset distance based on a communication delay between the vehicle and at least one of the first TCU or the second TCU, and a speed limit of the first location; and hand over the first device to the second TCU when the first location meets a first preset condition, wherein the first preset condition is that the first location is in the first sub-area and a distance between the first location and a boundary line between the first sub-area and the second sub-area is less than the preset distance when a message type of the first device message is a transaction message.

15. The TCU switching apparatus of claim 14, wherein the instructions further cause the TCU switching apparatus to hand over the first device to the second TCU when the first preset condition further comprises that the first TCU has a transaction message to send to the first device, and wherein the preset distance is a distance determined based on a communication delay between the vehicle and at least one of the first TCU and the second TCU, and a speed limit of the first location.

16. The TCU switching apparatus of claim 14, wherein the instructions further cause the TCU switching apparatus to be configured to delay handover when the first location of the first device meets the first preset condition and a message sending and receiving status of the first TCU meets a third preset condition.

17. The TCU switching apparatus of claim 16, wherein the third preset condition is that the first TCU has not responded to a transaction message from the first device in a first sub-area.

18. The TCU switching apparatus of claim 16, wherein the third preset condition is that the first TCU comprises a transaction message to be sent to the first device.

19. The TCU switching apparatus of claim 14, wherein the information exchange area is based on a risk analysis requirement.

20. The TCU switching apparatus of claim 14, wherein the information exchange area comprises a part of a coverage area of a base station that does not overlap with a coverage area of another base station or the information exchange area comprises at least an overlapping area between a coverage area of an edge base station of the first TCU and a coverage area of an edge base station of the second TCU.

21. A message synchronization apparatus, applied to a first TCU, wherein the message synchronization apparatus comprises: a processor; and a memory coupled to the processor and storing instructions that, when executed by the processor, cause the message synchronization apparatus to be configured to: receive, by the first TCU, a first device message directly from a first device located in a vehicle; determine a location of the first device based on the first device message; send the first device message of the first device to a second TCU when the location of the first device is in an information exchange area, wherein the information exchange area represents an area used for communication with at least one TCU and includes environment conditions in a traveling direction of the vehicle, and wherein the second TCU is a neighbor TCU of the first TCU in the traveling direction of the vehicle; determine a preset distance based on a communication delay between the vehicle and at least one of the first TCU or the second TCU, and a speed limit of the location; and hand over the first device to the second TCU when the location meets a first preset condition, wherein the first preset condition is that the location is in a first sub-area and a distance between the location and a boundary line between the first sub-area and a second sub-area is less than the preset distance when a message type of the first device message is a transaction message.

22. The message synchronization apparatus of claim 21, wherein the instructions further cause the message synchronization apparatus to be configured to receive a second device message of the first device from the second TCU when the first device is handed over to the second TCU, wherein the second device message of the first device is received from the first device in the information exchange area.

23. The message synchronization apparatus of claim 21, wherein the information exchange area is based on a risk analysis requirement.

24. The message synchronization apparatus of claim 21, wherein the information exchange area comprises at least an overlapping area between a first coverage area of a first edge base station and a second coverage area of a second edge base station, wherein the first TCU comprises the first edge base station, and wherein the second TCU comprises the second edge base station.

25. The message synchronization apparatus of claim 21, wherein the instructions further cause the message synchronization apparatus to be configured to hand over the first device when the first preset condition further comprises the first TCU has a transaction message to send to the first device.

26. The message synchronization apparatus of claim 21, wherein the instructions further cause the message synchronization apparatus to be configured to delay handover when the location of the first device meets the first preset condition and a message sending and receiving status of the first TCU meets a third preset condition.

* * * * *

UNITED STATES PATENT AND TRADEMARK OFFICE
CERTIFICATE OF CORRECTION

PATENT NO. : 11,528,649 B2
APPLICATION NO. : 16/815949
DATED : December 13, 2022
INVENTOR(S) : Yonggang Song, Hui Li and Fuxiang Xiong It is certified that error appears in the above-identified patent and that said Letters Patent is hereby corrected as shown below:

In the Claims

Claim 21, Column 30, Line 14: "distance when-a" should read "distance when a"

Signed and Sealed this
Seventeenth Day of January, 2023

Katherine Kelly Vidal
*Director of the United States Patent and Trademark Office*